US012690089B2

(12) United States Patent
Guo

(10) Patent No.: US 12,690,089 B2
(45) Date of Patent: Jul. 21, 2026

(54) ELECTRONIC DEVICE INTERACTION METHOD AND APPARATUS

(71) Applicant: HUAWEI TECHNOLOGIES CO., LTD., Guangdong (CN)

(72) Inventor: Peizhen Guo, Nanjing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 387 days.

(21) Appl. No.: 18/575,574

(22) PCT Filed: Jun. 23, 2022

(86) PCT No.: PCT/CN2022/100783
§ 371 (c)(1),
(2) Date: Dec. 29, 2023

(87) PCT Pub. No.: WO2023/274026
PCT Pub. Date: Jan. 5, 2023

(65) Prior Publication Data
US 2024/0334531 A1     Oct. 3, 2024

(30) Foreign Application Priority Data
Jul. 1, 2021     (CN) .......................... 202110743882.0

(51) Int. Cl.
*H04W 76/23*     (2018.01)
*H04W 4/80*     (2018.01)
(52) U.S. Cl.
CPC .............. *H04W 76/23* (2018.02); *H04W 4/80* (2018.02)

(58) Field of Classification Search
CPC ........... H04W 4/80; H04W 4/30; H04W 4/38; H04W 4/029; H04W 4/02; H04W 4/021; H04W 4/025
See application file for complete search history.

(56) References Cited

FOREIGN PATENT DOCUMENTS

| CN | 102340895 A | 2/2012 |
| CN | 102404035 A | 4/2012 |
| CN | 103297099 A | 9/2013 |
| CN | 104426582 A | 3/2015 |

(Continued)

OTHER PUBLICATIONS (CN 106535100 A), Zhang, A Locating Method for Mobile Terminal and Mobile Terminal and Server, Mar. 2017, pp. 1-22 (Year: 2017).*

(Continued)

*Primary Examiner* — Keith Ferguson
(74) *Attorney, Agent, or Firm* — Fish & Richardson P.C.

(57)     ABSTRACT

Page Examples of electronic device interaction methods and apparatus are described. In one example, a first electronic device is paired with a second electronic device through BLUETOOTH. The first electronic device is in a network-disconnected state. The second electronic device sends a query request to a server, to obtain a status of the first electronic device. The second electronic device sends the status of the first electronic device to the first electronic device. If the first electronic device is in a lost state, the first electronic device sends an offline locating request. The offline locating request indicates to the second electronic device to send location information of the second electronic device to the server.

20 Claims, 19 Drawing Sheets

(56) References Cited

FOREIGN PATENT DOCUMENTS

| CN | 104467925 A | 3/2015 |
|----|-------------|---------|
| CN | 106303907 A | 1/2017 |
| CN | 109474918 A | 3/2019 |
| CN | 110300393 A | 10/2019 |
| CN | 110389336 A | 10/2019 |
| CN | 112188454 A | 1/2021 |
| CN | 112272375 A | 1/2021 |
| CN | 112437401 A | 3/2021 |

OTHER PUBLICATIONS

Heinrich et al., "Who Can Find my Devices? Security and Privacy of Apple's Crowd-Sourced Bluetooth Location Tracking System," CoRR, submitted on Mar. 3, 2021, arxiv:2103.02282v1, 19 pages.
International Search Report and Written Opinion in International Appln. No. PCT/CN2022/100783, mailed on Oct. 8, 2022, 20 pages (with English translation).
Extended European Search Report in European Appln. No. 22831842. 4, mailed on Sep. 30, 2024, 46 pages.

* cited by examiner

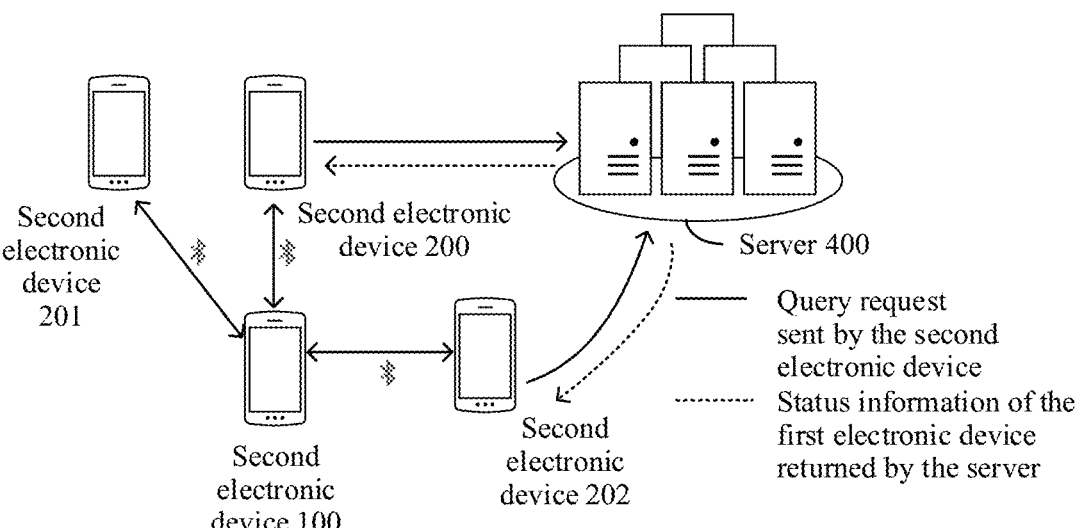

Second
electronic
device
201

Second electronic
device 200

Server 400

———— Query request
sent by the second
electronic device

---------- Status information of the
first electronic device
returned by the server Second
electronic
device 100

Second
electronic
device 202

FIG. 8a

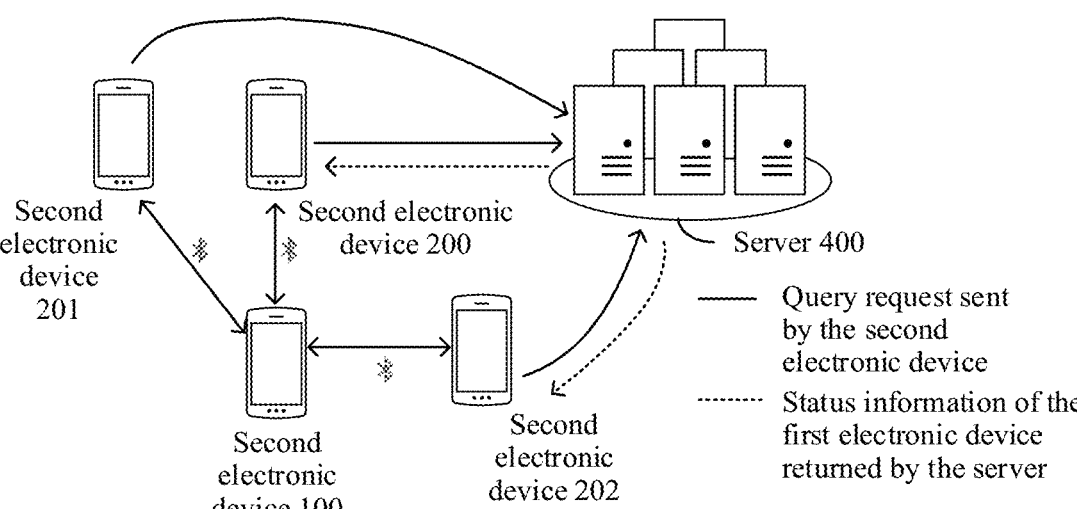

Second
electronic
device
201

Second electronic
device 200

Server 400

———— Query request sent
by the second
electronic device

---------- Status information of the
first electronic device
returned by the server Second
electronic
device 100

Second
electronic
device 202

FIG. 8b

CONT.
FROM
FIG. 9A

S17A: The first electronic device sends an offline locating request to the second electronic device, and the first electronic device is paired with the second electronic device through Bluetooth in a second mode S18: The second electronic device reports location information to the server S19: The server sends the location information of the second electronic device to a third electronic device, the third electronic device displays a first interface, and the first interface includes the location information of the second device

FIG. 9B

ELECTRONIC DEVICE INTERACTION METHOD AND APPARATUS

CROSS-REFERENCE TO RELATED APPLICATIONS

This application is a national stage of International Application No. PCT/CN2022/100783, filed on Jun. 23, 2022, which claims priority to Chinese Patent Application No. 202110743882.0, filed on Jul. 1, 2021. Both of the aforementioned applications are hereby incorporated by reference in their entireties.

TECHNICAL FIELD

This application relates to the field of electronic technologies, and in particular, to an electronic device interaction method and a related device.

BACKGROUND

Currently, when a smart electronic device is lost, a user usually needs to log in to an official website of a mobile phone manufacturer or log in with a cloud account of the lost smart electronic device on another electronic device, to view a specific geographical location at which the user recently or last logged in with the cloud account on the lost mobile phone, to find the mobile phone. When the lost device is online and in a network-connected state, a server can locate a current geographical location of the mobile phone in real time. However, if the lost device is offline and in a network-disconnected state, the server cannot obtain the location of the offline mobile phone. Therefore, the lost mobile phone cannot be found, resulting in poor user experience.

SUMMARY

Embodiments of this application provide an electronic device interaction method and apparatus, to locate a lost device. This can help a user find the lost device more quickly and accurately.

The following describes this application from different aspects. It should be understood that, for implementations and beneficial effects of the following different aspects, reference may be made to each other.

According to a first aspect, an embodiment of this application provides an electronic device interaction method, specifically including: A first electronic device sends a BLUETOOTH signal to a second electronic device. The first electronic device is in a network-disconnected state. The second electronic device performs scanning for the BLUETOOTH signal sent by the first electronic device. The first electronic device is paired with the second electronic device through BLUETOOTH. The second electronic device sends a query request to a server. The second electronic device receives returned information sent by the server. The returned information includes a status of the first electronic device. The second electronic device sends the status of the first electronic device to the first electronic device. The first electronic device determines whether the status is a lost state. If the first electronic device is in the lost state, the first electronic device sends an offline locating request. The offline locating request indicates the second electronic device to send location information of the second electronic device to the server. The second electronic device obtains the offline locating request. The second electronic device obtains the location information of the second electronic device based on the offline locating request, and sends the location information of the second electronic device to the server.

According to the foregoing embodiment, the second electronic device is paired with the first electronic device fast. In this way, locating of the offline lost device can be implemented by using the second electronic device around the lost device. This can help a user find the lost device more quickly and accurately.

According to the first aspect, in a possible implementation, that a first electronic device sends a BLUETOOTH signal to a second electronic device includes: The first electronic device performs BLUETOOTH advertising at preset transmitting frequency. The preset transmitting frequency is transmitting a BLUETOOTH advertisement one time at an interval of a first interval, and duration for the BLUETOOTH advertisement transmission is first duration.

According to the first aspect, in a possible implementation, that the second electronic device performs scanning for the BLUETOOTH signal sent by the first electronic device includes: The second electronic device performs scanning at preset scanning frequency. The preset scanning frequency is performing BLUETOOTH signal scanning at an interval of a second interval, and duration for the BLUETOOTH signal scanning is second duration.

According to the first aspect, in a possible implementation, a value of the second interval is not greater than a value of the first duration.

According to the foregoing solution, in a procedure of determining the lost state, steps for setting the frequency at which a transmitting device sends signals and the frequency at which a receiving device receives the signals are performed, to ensure that the transmitting device and the receiving device may discover each other. In addition, this lowers power consumption of the transmitting device and the receiving device, and avoids a waste of the power consumption in the procedure of determining the lost state.

According to the first aspect, in a possible implementation, before that a first electronic device sends a BLUETOOTH signal to a second electronic device, the method further includes: The first electronic device obtains the first interval and the first duration from the server, and the second electronic device obtains the second interval and the second duration from the server.

According to the first aspect, in a possible implementation, the offline locating request further indicates the first electronic device to be paired with the second electronic device through BLUETOOTH for a second time.

According to the first aspect, in a possible implementation, that the offline locating request further indicates the first electronic device to be paired with the second electronic device through BLUETOOTH for a second time includes: The first electronic device is paired with the second electronic device through BLUETOOTH in a second manner. That pairing is performed through BLUETOOTH in a second manner includes: The first electronic device continuously transmits the BLUETOOTH advertisement, and/or the second electronic device continuously performs scanning for the BLUETOOTH advertisement.

According to the first aspect, in a possible implementation, before that a first electronic device sends a BLUETOOTH signal to a second electronic device, the method further includes: A find phone function is enabled on the first electronic device.

According to the first aspect, in a possible implementation, the method further includes: A user logs in with an account of the first electronic device on a third electronic device. The server sends update information to the third electronic device, where the update information includes the location information of the second electronic device. The third electronic device displays a first interface, where the first interface includes a location of the second electronic device.

According to the first aspect, in a possible implementation, the method further includes that the first interface further includes information of the first electronic device.

According to the first aspect, in a possible implementation, the method further includes: If the first electronic device is not in the lost state, the method further includes: The first electronic device sends BLUETOOTH signals to the second electronic device at the preset transmitting frequency, and the second electronic device scans, at the preset scanning frequency, the BLUETOOTH signals sent by the first electronic device.

According to the first aspect, in a possible implementation, there are at least two second electronic devices.

According to the first aspect, in a possible implementation, there are at least two second electronic devices, and before that the second electronic device receives returned information sent by the server, the method further includes: The server determines whether a quantity of second electronic devices exceeds a first threshold. If the quantity of second electronic devices does not exceed the first threshold, the server sends the returned information to the second electronic devices. If the quantity of second electronic devices exceeds the first threshold, the server selects a part of the quantity of second electronic devices from the second electronic devices, and sends the returned information to the part of the quantity of second electronic devices.

According to the first aspect, in a possible implementation, before that the second electronic device sends a query request to a server, the method further includes: The second electronic device determines whether a quantity of service times exceeds a preset first threshold. If the second electronic device determines that the quantity of service times does not exceed the preset first threshold, the second electronic device sends the query request to the server. If the second electronic device determines that the quantity of service times exceeds the preset first threshold, the second electronic device does not send the query request to the server.

According to the first aspect, in a possible implementation, before that the second electronic device obtains the location information of the second electronic device based on the offline locating request, and sends the location information of the second electronic device to the server, the method further includes: The second electronic device determines whether the quantity of service times exceeds the preset first threshold. If the second electronic device determines that the quantity of service times does not exceed the preset first threshold, the second electronic device obtains the location information of the second electronic device, and sends the location information of the second electronic device to the server. If the second electronic device determines that the quantity of service times exceeds the preset first threshold, the second electronic device does not obtain the location information of the second electronic device.

According to a second aspect, an embodiment of this application provides an electronic device interaction method, specifically including: A first electronic device sends a BLUETOOTH signal to a second electronic device. The first electronic device is in a network-disconnected state. The first electronic device is paired with the second electronic device through BLUETOOTH. The first electronic device obtains a status that is of the first electronic device and that is sent by the second electronic device. The status of the first electronic device is obtained by the second electronic device from a server. The first electronic device determines whether the status is a lost state. If the first electronic device is in the lost state, the first electronic device sends an offline locating request. The offline locating request indicates the second electronic device to send location information of the second electronic device to the server.

According to the second aspect, in a possible implementation, that a first electronic device sends a BLUETOOTH signal to a second electronic device includes: The first electronic device performs BLUETOOTH advertising at preset transmitting frequency. The preset transmitting frequency is transmitting a BLUETOOTH advertisement one time at an interval of a first interval, and duration for the BLUETOOTH advertisement transmission is first duration.

According to the second aspect, in a possible implementation, that the first electronic device is paired with the second electronic device through BLUETOOTH includes: The second electronic device performs scanning at preset scanning frequency. The preset scanning frequency is performing BLUETOOTH signal scanning at an interval of a second interval, and duration for the BLUETOOTH signal scanning is second duration.

According to the second aspect, in a possible implementation, a value of the second interval is not greater than a value of the first duration.

According to the second aspect, in a possible implementation, before that a first electronic device sends a BLUETOOTH signal to a second electronic device, the method further includes: The first electronic device obtains the first interval and the first duration from the server.

According to the second aspect, in a possible implementation, the offline locating request further indicates the first electronic device to be paired with the second electronic device through BLUETOOTH for a second time.

According to the second aspect, in a possible implementation, that the offline locating request further indicates the first electronic device to be paired with the second electronic device through BLUETOOTH for a second time includes: The first electronic device continuously transmits the BLUETOOTH advertisement, and the first electronic device is paired with the second electronic device through BLUETOOTH.

According to the second aspect, in a possible implementation, before that a first electronic device sends a BLUETOOTH signal to a second electronic device, the method further includes: A find phone function is enabled on the first electronic device.

According to the second aspect, in a possible implementation, if the first electronic device is not in the lost state, the method further includes: The first electronic device sends BLUETOOTH signals to the second electronic device at the preset transmitting frequency.

According to a third aspect, an embodiment of this application provides an electronic device interaction method, specifically including: A second electronic device performs scanning for a BLUETOOTH signal sent by a first electronic device. The second electronic device is paired with the first electronic device through BLUETOOTH. The second electronic device sends a query request to a server. The second electronic device receives returned information sent by the server. The returned information includes a status of the first electronic device. The second electronic device sends the status of the first electronic device to the first electronic device. The second electronic device obtains an offline locating request sent by the first electronic device. The second electronic device obtains location information of the second electronic device based on the offline locating request, and sends the location information of the second electronic device to the server.

According to the third aspect, in a possible implementation, that a first electronic device sends a BLUETOOTH signal to a second electronic device includes: The first electronic device performs BLUETOOTH advertising at preset transmitting frequency. The preset transmitting frequency is transmitting a BLUETOOTH advertisement one time at an interval of a first interval, and duration for the BLUETOOTH advertisement transmission is first duration.

According to the third aspect, in a possible implementation, that a second electronic device performs scanning for a BLUETOOTH signal sent by a first electronic device includes: The second electronic device performs scanning at preset scanning frequency. The preset scanning frequency is performing BLUETOOTH signal scanning at an interval of a second interval, and duration for the BLUETOOTH signal scanning is second duration.

According to the third aspect, in a possible implementation, a value of the second interval is not greater than a value of the first duration.

According to the third aspect, in a possible implementation, before that a second electronic device performs scanning for a BLUETOOTH signal sent by a first electronic device, the method further includes: The second electronic device obtains the second interval and the second duration from the server.

According to the third aspect, in a possible implementation, the offline locating request further indicates the first electronic device to be paired with the second electronic device through BLUETOOTH for a second time.

According to the third aspect, in a possible implementation, that the offline locating request further indicates the first electronic device to be paired with the second electronic device through BLUETOOTH for a second time includes: The second electronic device continuously performs scanning for the BLUETOOTH advertisement, and the first electronic device is paired with the second electronic device through BLUETOOTH for the second time.

According to the third aspect, in a possible implementation, there are at least two second electronic devices.

According to the third aspect, in a possible implementation, before that the second electronic device sends a query request to a server, the method further includes: The second electronic device determines whether a quantity of service times exceeds a preset first threshold. If the second electronic device determines that the quantity of service times does not exceed the preset first threshold, the second electronic device sends the query request to the server. If the second electronic device determines that the quantity of service times exceeds the preset first threshold, the second electronic device does not send the query request to the server.

According to the third aspect, in a possible implementation, before that the second electronic device obtains location information of the second electronic device based on the offline locating request, and sends the location information of the second electronic device to the server, the method further includes: The second electronic device determines whether the quantity of service times exceeds the preset first threshold. If the second electronic device determines that the quantity of service times does not exceed the preset first threshold, the second electronic device obtains the location information of the second electronic device, and sends the location information of the second electronic device to the server. If the second electronic device determines that the quantity of service times exceeds the preset first threshold, the second electronic device does not obtain the location information of the second electronic device.

According to a fourth aspect, an embodiment of this application provides an electronic device. The electronic device is used as a first electronic device, and includes a touchscreen, a memory, a transceiver, one or more processors, a plurality of applications, and one or more programs. The one or more programs are stored in the memory. The transceiver is configured to transmit or receive a radio signal. When the one or more processors execute the one or more programs, the electronic device is enabled to implement the method according to any item of the first aspect.

According to a fifth aspect, an embodiment of this application provides an electronic device. The electronic device is used as a first electronic device, and includes a touchscreen, a memory, a transceiver, one or more processors, a plurality of applications, and one or more programs. The one or more programs are stored in the memory. The transceiver is configured to transmit or receive a radio signal. When the one or more processors execute the one or more programs, the electronic device is enabled to implement the method according to any item of the second aspect.

According to a sixth aspect, an embodiment of this application provides an electronic device. The electronic device is used as a first electronic device, and includes a touchscreen, a memory, a transceiver, one or more processors, a plurality of applications, and one or more programs. The one or more programs are stored in the memory. The transceiver is configured to transmit or receive a radio signal. When the one or more processors execute the one or more programs, the electronic device is enabled to implement the method according to any item of the third aspect.

According to a seventh aspect, an embodiment of this application provides a computer-readable storage medium. The computer-readable storage medium stores a computer program. The computer program includes program instructions. When the program instructions are executed by a computer, the computer is enabled to perform the method according to any item of the first aspect.

According to an eighth aspect, an embodiment of this application provides a computer-readable storage medium. The computer-readable storage medium stores a computer program. The computer program includes program instructions. When the program instructions are executed by a computer, the computer is enabled to perform the method according to any item of the second aspect.

According to a ninth aspect, an embodiment of this application provides a computer-readable storage medium. The computer-readable storage medium stores a computer program. The computer program includes program instructions. When the program instructions are executed by a computer, the computer is enabled to perform the method according to any item of the third aspect.

According to a tenth aspect, an embodiment of this application provides a computer program product. When the computer program product is run on a computer, the computer is enabled to perform the method according to any item of the first aspect, the method according to the second aspect, or the method according to the first aspect.

According to an eleventh aspect, an embodiment of this application provides a computer program product. When the computer program product is run on a computer, the computer is enabled to perform the method according to any item of the first aspect, the method according to the second aspect, or the method according to the second aspect.

According to a twelfth aspect, an embodiment of this application provides a computer program product. When the computer program product is run on a computer, the computer is enabled to perform the method according to any item of the first aspect, the method according to the second aspect, or the method according to the third aspect.

BRIEF DESCRIPTION OF DRAWINGS

To describe technical solutions in embodiments of this application more clearly, the following briefly describes accompanying drawings for describing embodiments.

FIG. 8*a* is a schematic diagram of an electronic device interaction system according to an embodiment of this application;

FIG. 8*b* is a schematic diagram of an electronic device interaction system according to an embodiment of this application;

FIG. 9A and FIG. 9B are a schematic diagram of an electronic device interaction procedure according to an embodiment of this application;

DESCRIPTION OF EMBODIMENTS

The following clearly and completely describes the technical solutions in embodiments of this application with reference to the accompanying drawings in embodiments of this application.

To make a person skilled in the art understand the technical solutions in the present invention better, the following clearly and completely describes the technical solutions in embodiments of the present invention with reference to the accompanying drawings in embodiments of the present invention. It is clear that the described embodiments are merely some rather than all of embodiments of the present invention. All other embodiments obtained by a person of ordinary skill in the art based on embodiments of the present invention without creative efforts shall fall within the protection scope of the present invention.

The terms "include", "contain" and any other variants in the specification, claims, and the accompanying drawings of the present invention mean to cover the non-exclusive inclusion, for example, a process, method, system, product, or device that includes a list of steps or units is not necessarily limited to those units, but may include other units not expressly listed or inherent to such a process, method, system, product, or device.

For a clear description, in this specification, establishing a BLUETOOTH connection between two devices means establishing a BLUETOOTH link between the two devices, and either of the two devices may, by using the BLUETOOTH link, send a signal to the other device or receive a signal sent by the other device, and the signals are referred to as BLUETOOTH signals.

Figure 1:
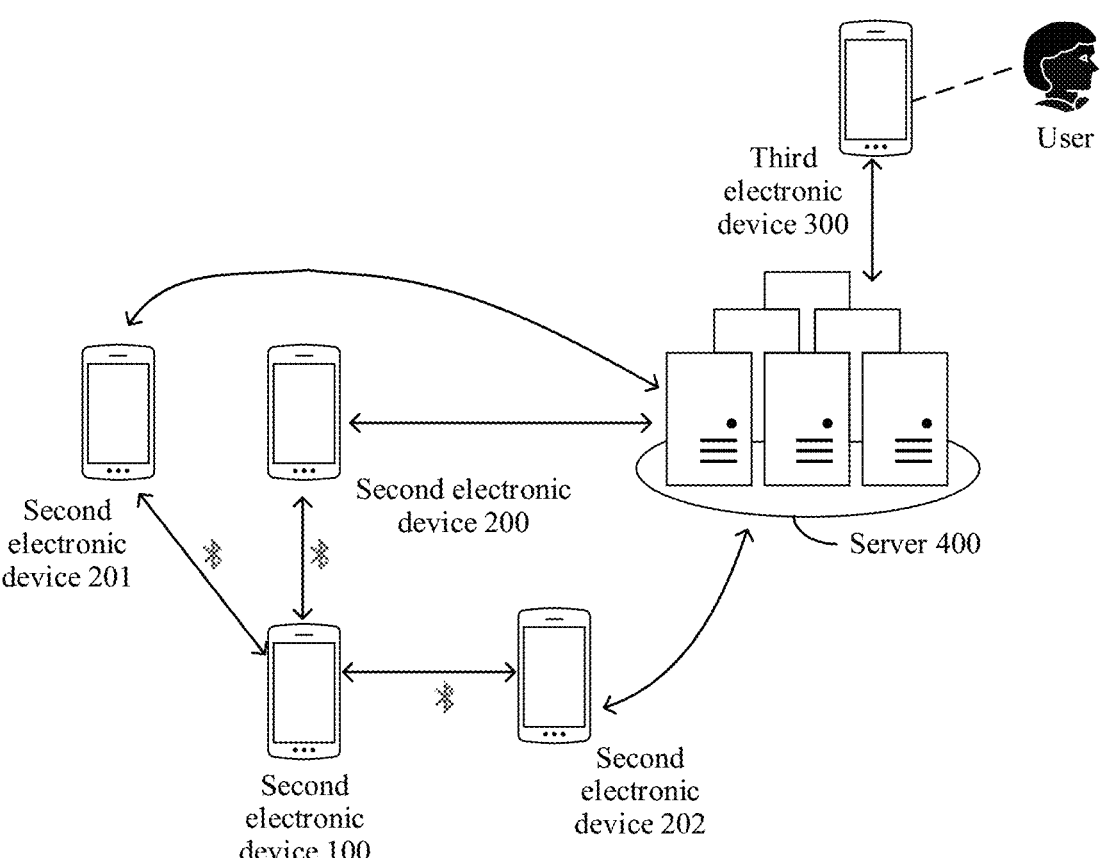
FIG. 1 is a schematic diagram of a scenario of an electronic device interaction system according to an embodiment of this application.

For ease of understanding the present invention, the following first describes an application scenario of an obtaining device and method according to the present invention. As shown in FIG. 1, FIG. 1 is a diagram of an application scenario of obtaining devices according to the present invention.

An electronic device interaction system according to an embodiment of this application at least includes two electronic devices. The electronic devices in this embodiment of this application may be electronic devices that support BLUETOOTH. Refer to FIG. 1. The electronic device interaction system includes two electronic devices, which are respectively a first electronic device 100 and a second electronic device 200. Both the first electronic device 100 and the second electronic device 200 may include BLUETOOTH modules. The BLUETOOTH module may be integrated into the electronic device (that is, in an integrated manner), or may be disposed on the electronic device in a pluggable manner. The first electronic device 100 may be connected to the second electronic device 200 through BLUETOOTH. Optionally, both the first electronic device 100 and the second electronic device 200 may be electronic devices that support BLUETOOTH, for example, mobile phones, and wearable devices such as smart watches, tablet computers, or personal digital assistants (PDA). Optionally, the first electronic device 100 and the second electronic device 200 may be electronic devices of a same type, for example, both the first electronic device 100 and the second electronic device 200 are mobile phones. Alternatively, the first electronic device 100 and the second electronic device 200 may be electronic devices of different types, for example, the first electronic device 100 is a mobile phone, and the second electronic device 200 is a smart watch.

In some feasible implementations, the second electronic device may be any device around a lost device. There may be at least one second electronic device. The second electronic device 200 may communicate with the first electronic device through BLUETOOTH. The second electronic device has a locating assistance capability. When a user of the second electronic device enables a locating assistance function, the second electronic device has a capability of obtaining current location information of the electronic device. The location information may be, for example, longitude/latitude information. The locating procedure may be implemented by using a global positioning system (GPS). The second electronic device has a network connection capability. The network connection capability means connection to the Internet through Wi-Fi or a cellular network. When the user of the second electronic device enables a network connection function (enables the Wi-Fi or cellular network), the second electronic device is in a network-connected state, and the second electronic device may communicate with a server. The second electronic device may be used as a device of a kind-hearted person. Location information of the second electronic device is reported to the server. This helps obtain an approximate area in which the lost device is located to locate the lost device, to quickly find the lost device.

In some feasible implementations, the first electronic device is the lost device. There may be at least one first electronic device. The first electronic device has a network connection capability. The network connection capability means that the first electronic device is connected to the Internet through Wi-Fi or a cellular network. In an embodiment of this application, when the first electronic device is in a state in which a user disables a network connection function (disables the Wi-Fi or cellular network), the first electronic device is in a network-disconnected state, and the second electronic device cannot communicate with the server. Therefore, the first electronic device cannot report location information of the first electronic device to the server by using a locating module of the first electronic device.

In some feasible implementations, the server is configured to communicate with the electronic device, may store related information and status information of the electronic device, and may provide electronic device information management and a find phone service. The first electronic device is registered with the server for an account. The registration account is a sequence bound to an international mobile equipment identity (IMEI) or a mobile equipment identity (MEID) of the first electronic device. In this way, the first electronic device is bound to the registration account. Moreover, the user may set a password for using the registration account. The user is a valid user of the registration account, so that the user logs in with the registration account on the server. Similarly, the second electronic device may also be registered with the server for an account, so that the user of the second electronic device may exchange information with the server by using the registration account. The registration accounts of the first electronic device and the second electronic device may be system accounts of terminal devices. In some other embodiments, the registration accounts of the first electronic device and the second electronic device may be obtained by registering with applications for corresponding accounts after the corresponding applications are downloaded. Therefore, the second electronic device and the first electronic device may be terminal devices produced by different terminal manufacturers. Implementation solutions in this application may be implemented, provided that applications that can interact with the server are installed on the second electronic device and the first electronic device.

In some feasible implementations, the provided electronic device interaction system further includes a third electronic device. The user may log in with the registration account of the first electronic device on the third electronic device, and interacts with the server with the registration account of the first electronic device. The third electronic device may be a computer, a mobile phone, or a wearable device like a smart watch or a tablet computer. When the third electronic device is a computer, the user may log in to a service website (for example, a portal system, Portal) of the server with the user account. When the third electronic device is a mobile device like a mobile phone, the user may log in to an application (for example, Find My Device) with the user account. After logging in with the account of the first electronic device on the third electronic device, the user may remotely control the first electronic device to perform a corresponding function. For example, the user may tap "Locate device" to obtain the current location of the first electronic device. The user may tap "Play sound" to make the first electronic device ring. The user may tap "Lost mode" to set a mode of the first electronic device to the lost mode. Alternatively, the user may tap "Erase data" to delete related data of the first electronic device.

For ease of understanding, the following describes, with reference to examples, a structure of the first electronic device 100 provided in embodiments of this application.

Figure 2:
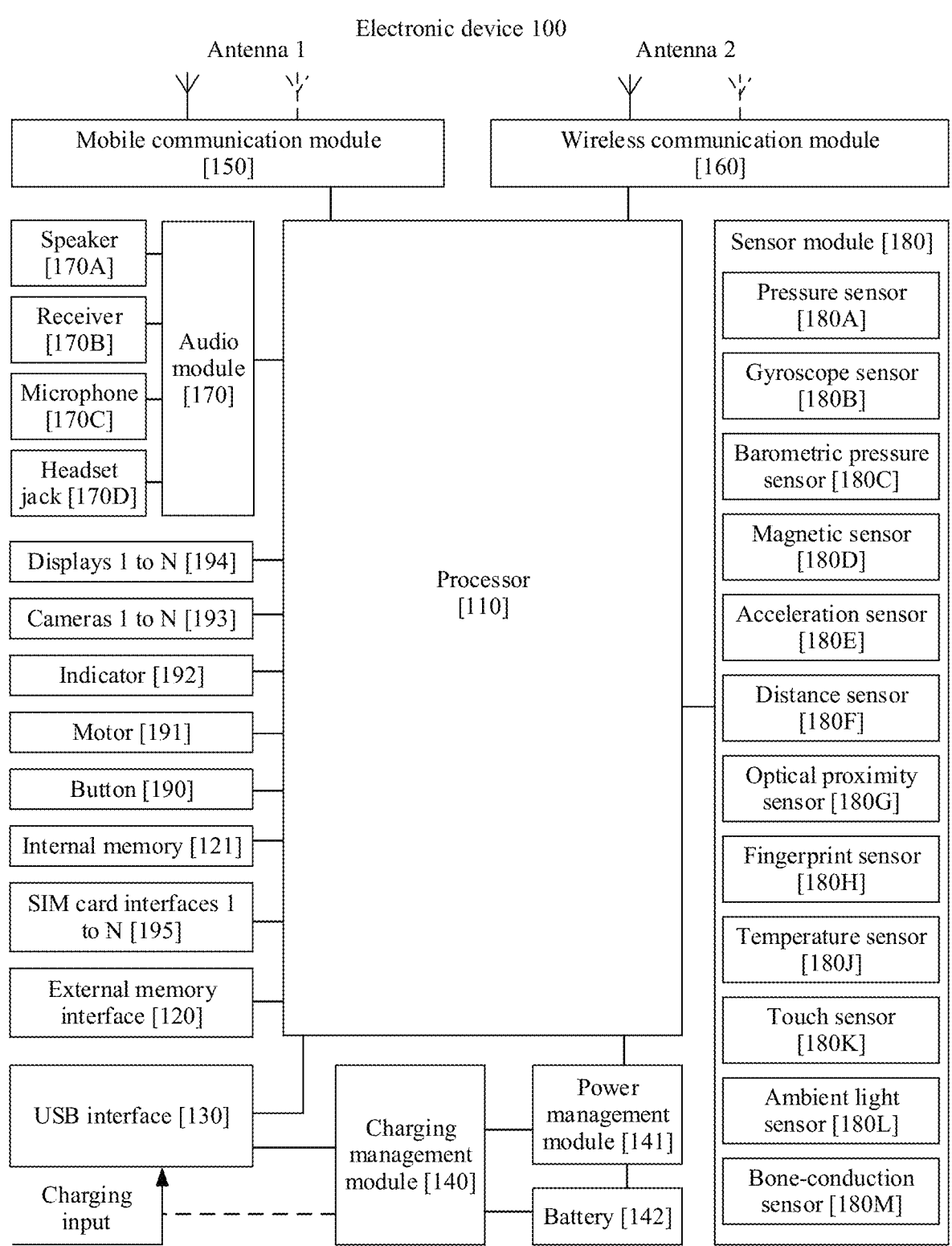
FIG. 2 is a schematic diagram of a structure of a first electronic device according to an embodiment of this application.

FIG. 2 is a schematic diagram of a structure of a first electronic device according to an embodiment of this application. The first electronic device shown in FIG. 2 may be a mobile phone, a tablet computer, or a PAD.

As shown in FIG. 2, the first electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone-conduction sensor 180M, and the like.

It may be understood that a structure shown in this embodiment of this application does not constitute a specific limitation on the first electronic device 100. In some other feasible implementations of this application, the first electronic device 100 may include more or fewer components than those shown in the figure. Alternatively, some components may be combined, some components may be split, or there may be a different component arrangement. This may be specifically determined based on an actual application scenario, and is not limited herein. The components shown in FIG. 2 may be implemented by using hardware, software, or a combination of software and hardware.

Optionally, the processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the first electronic device 100. The controller may generate an operation control signal based on an instruction operation code and a time sequence signal, to complete control of instruction fetching and instruction execution.

A memory may be further disposed in the processor 110, and is configured to store instructions and data. In some feasible implementations, the memory in the processor 110 is a cache memory. The memory may store instructions or data that has been used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some feasible implementations, the processor 110 may include one or more interfaces. The interface may include an inter-integrated circuit (I2C) interface, an inter-integrated circuit sound (12S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that, an interface connection relationship between the modules shown in this embodiment of this application is merely an example for description, and does not constitute a structural limitation on the first electronic device 100. In some other feasible implementations of this application, the first electronic device 100 may alternatively use an interface connection manner different from that in the foregoing embodiment, or a combination of a plurality of interface connection manners.

The charging management module 140 is configured to receive a charging input from a charger to charge the power management module 141 of the first electronic device 100. The charger may be a wireless charger or a wired charger.

The power management module 141 is configured to be connected to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like.

A wireless communication function of the first electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Optionally, the antenna 1 and the antenna 2 may be configured to transmit a BLUETOOTH signal. Each antenna in the first electronic device 100 may be configured to cover one or more communication bands. Different antennas may be further multiplexed, to improve antenna utilization. For example, the antenna 1 may be multiplexed as a diversity antenna of a wireless local area network. In some other feasible implementations, the antenna may be used in combination with a tuning switch.

The mobile communication module 150 may provide a solution applied to the first electronic device 100 for wireless communication including 2G/3G/4G/5G or the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the processed electromagnetic wave to the modem processor for demodulation. The mobile communication module 150 may further amplify a signal modulated by the modem processor, and convert the amplified signal into an electromagnetic wave for radiation through the antenna 1. In some feasible implementations, at least some function modules of the mobile communication module 150 may be disposed in the processor 110. In some feasible implementations, at least some function modules of the mobile communication module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and is then transmitted to the application processor. The application processor outputs a sound signal by using an audio device (which is not limited to the speaker 170A, the receiver 170B, or the like), or displays an image or a video by using the display 194. In some feasible implementations, the modem processor may be an independent component. In some other feasible implementations, the modem processor may be independent of the processor 110, and disposed in a same device as the mobile communication module 150 or another function module.

The wireless communication module 160 may provide a solution applied to the first electronic device 100 for wireless communication including wireless local area network (WLAN), for example, a Wi-Fi network, BLUETOOTH (BT), a global navigation satellite system (GNSS), frequency modulation (FM), near field communication (NFC), and infrared (IR) technologies. The wireless communication module 160 may be one or more components integrated into at least one communication processing module. The wireless communication module 160 receives an electromagnetic wave by using the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the modulated and amplified signal into an electromagnetic wave for radiation through the antenna 2.

In some feasible implementations, in the first electronic device 100, the antenna 1 is coupled to the mobile communication module 150, and the antenna 2 is coupled to the wireless communication module 160, so that the first electronic device 100 can communicate with a network and another device (for example, a second electronic device 200) by using a wireless communication technology. The wireless communication technology may include a global system for mobile communications (GSM), a general packet radio service (GPRS), code division multiple access (CDMA), wideband code division multiple access (WCDMA), time-division synchronous code division multiple access (TD-SCDMA), long term evolution (LTE), BT, a GNSS, a WLAN, NFC, FM, an IR technology, and/or the like. The foregoing GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The first electronic device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some feasible implementations, the first electronic device 100 may include one or N displays 194, where N is a positive integer greater than 1.

In some feasible implementations, the display 194 may be configured to display interfaces output by a system of the first electronic device 100. For the interfaces output by the first electronic device 100, refer to related descriptions of subsequent embodiments.

The first electronic device 100 may implement a photographing function by using the ISP, the camera 193, the video codec, the GPU, the display 194, the application processor, and the like.

The external memory interface 120 may be configured to be connected to an external memory card, for example, a micro SD card, to expand a storage capability of the first electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 executes various function applications and data processing of the first electronic device 100 by running the instructions stored in the internal memory 121. The internal memory 121 may include a program storage area and a data storage area. The program storage area may store an operating system, an application required by at least one function (for example, a device management function and a sound playing function), and the like. The data storage area may store data (for example, device parameters and an address book) and the like created in a procedure of using the first electronic device 100. In addition, the internal memory 121 may include a high-speed random access memory, or may include a non-volatile memory, for example, at least one magnetic disk storage device, a flash memory, a universal flash storage (UFS), or the like.

The first electronic device 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal.

The speaker 170A, also referred to as a "loudspeaker", is configured to convert an audio electrical signal into a sound signal.

The receiver 170B, also referred to as an "earpiece", is configured to convert an electrical audio signal into a sound signal.

The microphone 170C, also referred to as a "mike" or a "mic", is configured to convert a sound signal into an electrical signal.

The headset jack 170D is configured to be connected to a wired headset. The headset jack 170D may be a USB interface 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some feasible implementations, the pressure sensor 180A may be disposed on the display 194. The gyroscope sensor 180B may be configured to determine a motion posture of the first electronic device 100. The barometric pressure sensor 180C is configured to measure barometric pressure.

The acceleration sensor 180E may detect accelerations in various directions (usually on three axes) of the electronic device 100.

The distance sensor 180F is configured to measure a distance.

The ambient light sensor 180L is configured to sense ambient light brightness.

The fingerprint sensor 180H is configured to collect a fingerprint.

The temperature sensor 180J is configured to detect a temperature.

The touch sensor 180K is also referred to as "a touch panel". The touch sensor 180K may be provided in the display 194, and the touch sensor 180K and the display 194 form a touchscreen, which is also referred to as a "touchscreen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other feasible implementations, the touch sensor 180K may alternatively be disposed on a surface of the first electronic device 100 and at a location different from that of the display 194.

The button 190 includes a power button, a volume button, and the like. The button 190 may be a mechanical button or a touch button.

The motor 191 may generate a vibration prompt.

The indicator 192 may be an indicator light, and may be configured to indicate a charging status and a power change, or may be configured to indicate a message, a missed call, a notification, and the like.

The SIM card interface 195 is configured to be connected to a SIM card. The SIM card may be inserted into the SIM card interface 195 or removed from the SIM card interface 195, to implement contact with and separation from the first electronic device 100. In some feasible implementations, the first electronic device 100 uses an eSIM, namely, an embedded SIM card. The eSIM card may be embedded in the first electronic device 100, and cannot be separated from the first electronic device 100.

A software system of the first electronic device 100 may use a layered architecture, an event-driven architecture, a microkernel architecture, a microservice architecture, or a cloud architecture. In an embodiment of this application, a software structure of the first electronic device 100 is described by using an Android system with a layered architecture as an example.

Figure 3A:
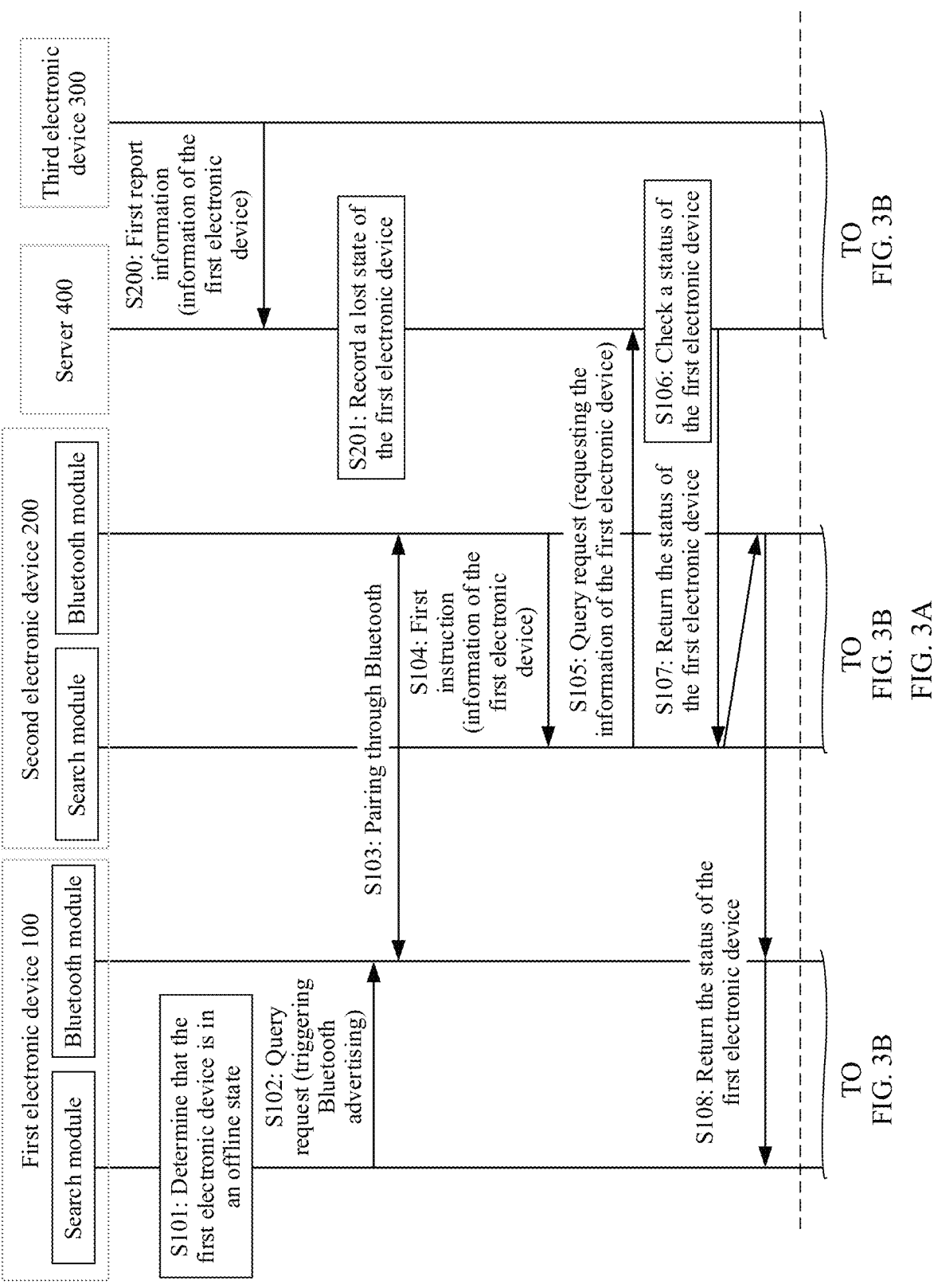
FIG. 3A and FIG. 3B are a schematic diagram of an electronic device interaction procedure according to an embodiment of this application.
Figure 3B:
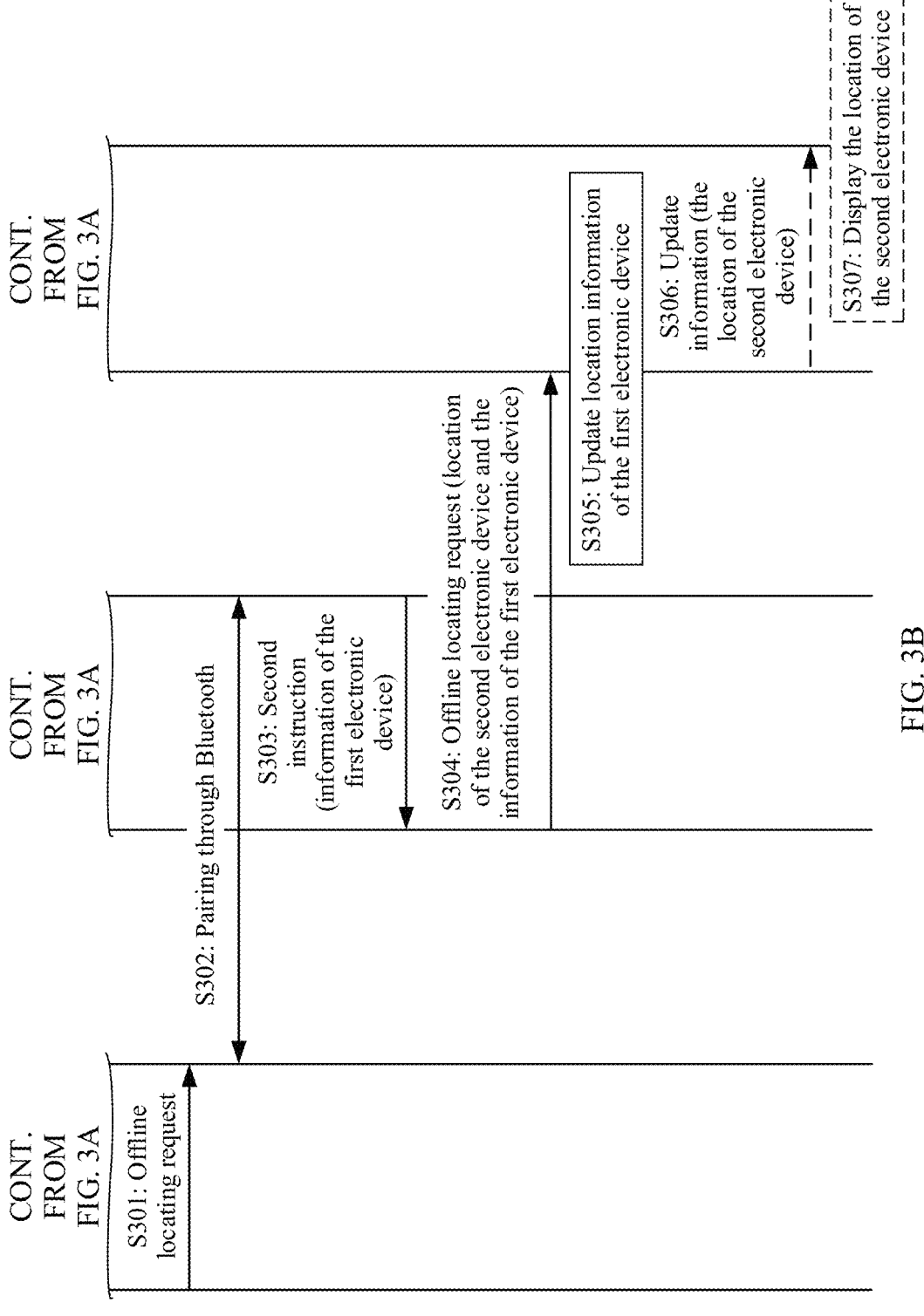

FIG. 3A and FIG. 3B are a block diagram of a software structure of a first electronic device according to an embodiment of this application.

As shown in FIG. 3A and FIG. 3B, a layered architecture divides software into several layers, each with a clear role and division of labor. The layers communicate with each other through a software interface. In some feasible implementations, an Android system may be divided into four layers, which are respectively an application layer, an application framework layer, Android runtime and system libraries, and a kernel layer from top to bottom.

The application layer may include a series of application packages.

As shown in FIG. 3A and FIG. 3B, the application packages may include applications (APP) such as BLUETOOTH, a device management application (an application with a device management function), navigation, maps, WLAN, short message service, gallery, calendar, call, or the like.

The application framework layer provides an application programming interface and a programming framework for an application on the application layer. The application framework layer includes some predefined functions.

As shown in FIG. 3A and FIG. 3B, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content providers are configured to store and retrieve data and make the data accessible to applications. The data may include a video, an image, audio, calls that are made and received, a browsing history and bookmarks, an address book, and the like.

The view system includes visual controls such as a control for displaying a text and a control for displaying an image. The view system may be configured to construct an application program. A display interface may include one or more views. For example, a display interface including a messaging notification icon may include a text display view and an image display view.

The phone manager is configured to provide a communication function of the first electronic device 100, for example, call status management (including call connection and disconnection, and the like).

The resource manager provides various resources for applications, such as localized strings, icons, images, layout files, and video files.

The notification manager enables an application to display notification information in the status bar, and can be used to communicate notification-type messages, which may automatically disappear after a short stay without user interaction. For example, the notification manager is configured to give notifications of download completion, messages, and the like. The notification manager may also be a notification that appears in the top status bar of the system in the form of a chart or scroll bar text, for example, a notification of an application running in the background, or a notification that appears on the screen in the form of a dialog interface. For example, text information is displayed in the status bar, an alert tone is issued, the electronic device vibrates, or an indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to perform functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The electronic device interaction method in this embodiment of this application is applicable to a locating scenario of one or more electronic devices. For ease of description, the following uses only an example in which one electronic device locates another electronic device for description. It may be understood that, in the locating scenario, at least one first electronic device is located, and the second electronic device may alternatively locate a plurality of other electronic devices simultaneously.

FIG. 3A and FIG. 3B are a schematic diagram of an electronic device interaction method according to an embodiment of this application. FIG. 3A and FIG. 3B show electronic device interaction between a first electronic device 100 and a second electronic device 200, and an internal data processing procedure of the first electronic device 100.

Phase 1: A phase for determining that the first electronic device is in a lost state.

S101: The first electronic device determines that the electronic device is in an offline state.

Specifically, the offline state means that a Wi-Fi network or a cellular network of the first electronic device is not enabled, and the first electronic device cannot log in to the Internet.

In some embodiments, the first electronic device may be in an environment in which network connection is of poor quality. In this case, the first electronic device may be intermittently connected to the network. Therefore, in some cases, preset time is set for the first electronic device. If offline time of the electronic device exceeds the preset time, the electronic device determines that a current status is the offline state. Alternatively, if the offline time of the electronic device does not exceed the preset time, the electronic device determines that the current status is a non-offline state. In some embodiments, when a user actively disables connection between a mobile phone and the network, the electronic device determines that the current status is the offline state. This triggers the following steps for finding the lost device. Therefore, when the mobile phone is lost, a find phone function can also be implemented even if network information of the mobile phone is disabled by another person. The preset time is set, so that a case in which the electronic device mistakenly determines poor-quality connection as the lost state and sends a BLUETOOTH signal is avoided. This avoids unnecessary waste of power consumption of the electronic device.

Figure 5A:
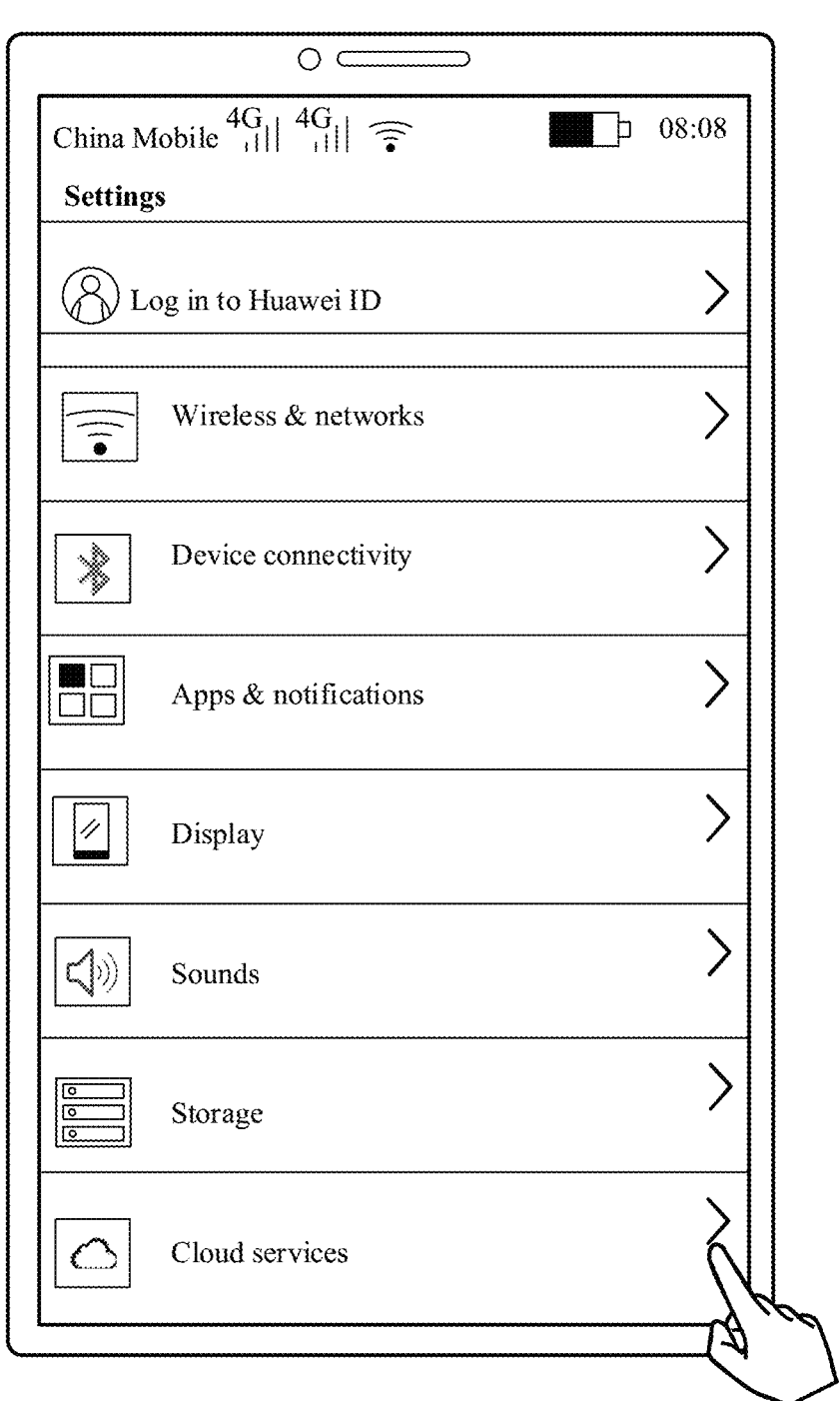
FIG. 5*a* to FIG. 5*d* are schematic diagrams of interfaces of a first electronic device according to an embodiment of this application.
Figure 5B:
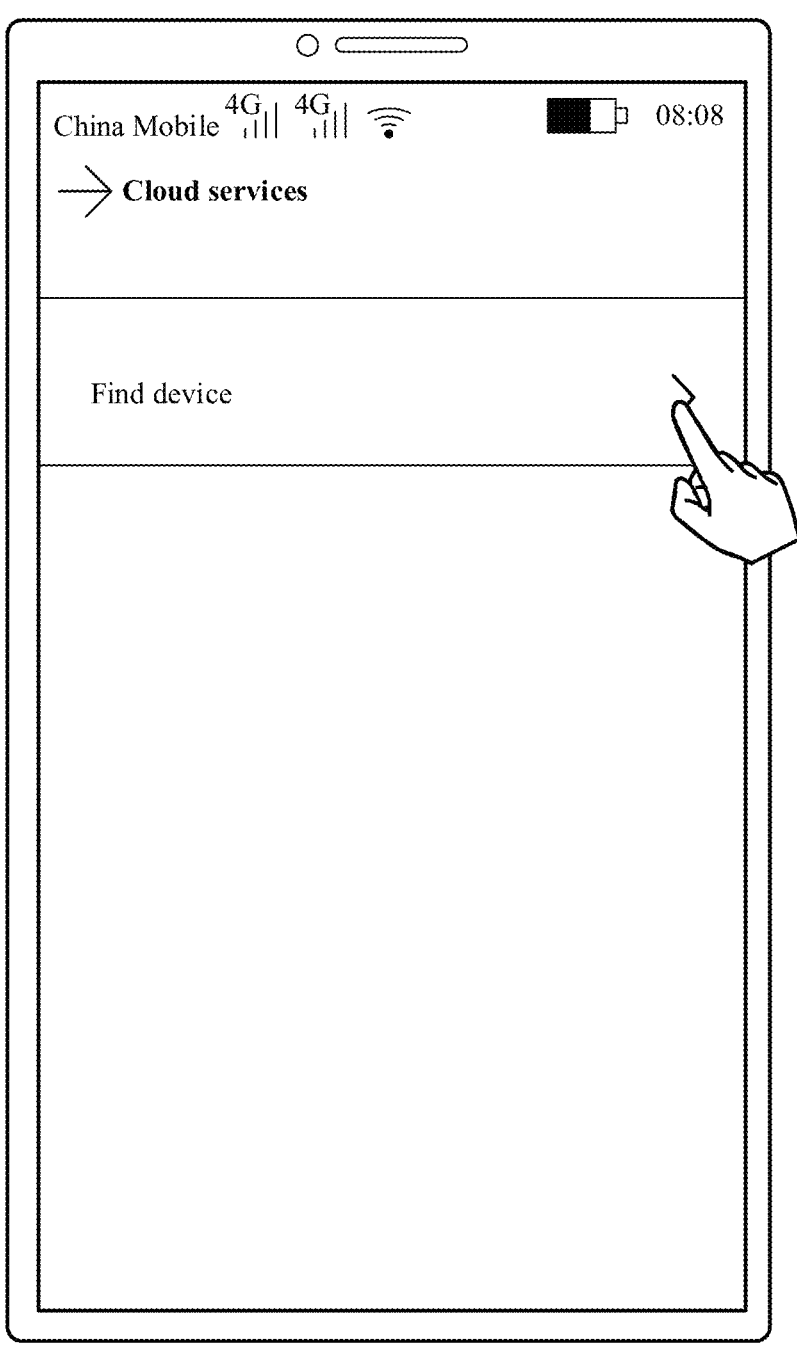
Figure 5C:
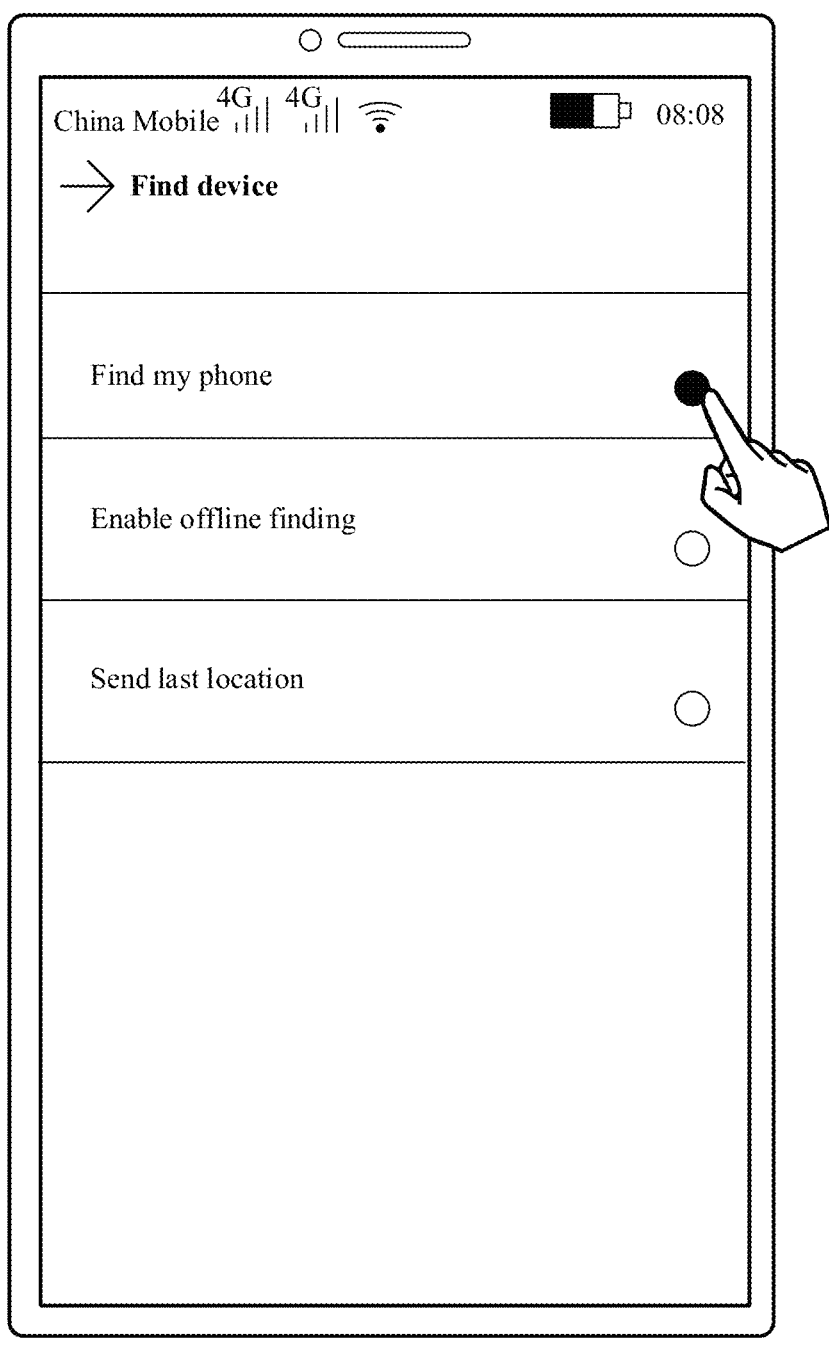

In some embodiments, the first electronic device needs to enable a "Find my phone" function. Specifically, as shown in FIG. 5a to FIG. 5c, a "Cloud services" module in settings of the first electronic device may be selected, and then a "Find device" function in a "Cloud services" function is selected. When the electronic device enables the "Find device" function, if the electronic device determines that the current status is the offline state, the fine phone function is performed. The find phone function includes: if the mobile phone is online, reporting current location information of the mobile phone to a cloud server in real time, where the location information may be obtained by using a GPS module of the mobile phone; and if the mobile phone is offline, sending a BLUETOOTH signal, to attempt to pair the mobile phone with another mobile phone, and reporting a signal of the lost mobile phone to the server.

In some implementations, the current location information of the electronic device is obtained, and the location information may be, for example, longitude/latitude information. The locating procedure may be implemented by using a global positioning system (GPS).

In some implementations, the "Find device" function includes functions of "Find my phone", "Enable offline finding", and "Send last location". "Enable Find my phone" may be used to find the mobile phone when the mobile phone is in the network-connected state. For example, when the user taps Locate device in FIG. 7c, the server sends a locating instruction to the lost device. When the "Enable Find my phone" function is enabled on the lost device, the lost device sends the current location to the server. Alternatively, when a power level of the lost device is lower than a preset value, "Enable Find my phone" is enabled on the lost device, and the lost device is in a network-connected state, the lost device sends the current location to the server. In addition, when "Enable offline finding" is enabled, the user may execute the function of offline phone finding, and specifically, may execute following steps for phone finding on the lost device in this embodiment. When "Send last location" is enabled, information about the last location of the lost device before the lost device goes offline is sent to the cloud server. Alternatively, when the battery level of the lost device is lower than the preset value, the current location is sent to the server. The location information may be obtained by using the GPS module of the mobile phone.

In some embodiments, a search module is disposed in the first electronic device, and is configured to determine whether a searching function of the first electronic device is enabled. When the searching function of the first electronic device is enabled, the location of the electronic device is reported to the server end in real time. In addition, the searching function is used to detect a network status of the first electronic device. If the electronic device is in the offline state, the offline finding function of the electronic device is executed.

S102: The search module of the first electronic device sends a pairing request to a BLUETOOTH module. The pairing request invokes a BLUETOOTH interface, and triggers the BLUETOOTH module to transmit a BLUETOOTH advertisement.

In some embodiments, when determining that the current status is the offline state, the first electronic device may directly invoke the interface of the BLUETOOTH module, to trigger the BLUETOOTH module to transmit the BLUETOOTH advertisement. In some embodiments, when the first electronic device determines that the current status is the offline state, even in a scenario in which the BLUETOOTH function is not enabled on the first electronic device, or the user disables the BLUETOOTH function on an operation interface, the first electronic device is not affected and directly invokes the BLUETOOTH module. In other words, the first electronic device in the offline state may drive, by using an internal instruction of the system, the BLUETOOTH module to send an advertisement signal.

In some embodiments, the BLUETOOTH advertisement carries an identifier of the first electronic device, and the identifier is used by the server to identify an identity of the first electronic device. Specifically, when the user logs in to the server on the first electronic device, the account of the first electronic device and the identifier of the electronic device are sent to the server. The server stores the account and the identifier of the first electronic device. When the identifier of the electronic device is subsequently received, the identifier may match the corresponding account. In some embodiments, the BLUETOOTH advertisement carries a public key of the first electronic device. The public key is used by the server to identify identity of the first electronic device. Specifically, when the user logs in to the server on the first electronic device, the account of the first electronic device and the public key of the electronic device are sent to the server. The server stores the account and the public key of the first electronic device. When the public key of the electronic device is subsequently received, the public key may match the corresponding account. In some implementations, the first electronic device updates public key information at intervals (for example, every other day). In this case, the first electronic device may send, to the server in advance, public key information subsequently obtained through updating (for example, the next 14 days), and the server stores the account of the first electronic device and all public keys. In this way, even if the electronic device is connected to the server after the electronic device is lost for a period of time, the server may identify a signal of the first electronic device based on the prestored public keys. Specifically, the electronic device uploads the public keys to a server side by using another device on the second day after the electronic device is lost. In this case, because the public key information for the next 14 days after the electronic device is lost is prestored by the server side, corresponding device information may be obtained through matching based on the pre-stored public key information. In this implementation, the public key information of the first electronic device is not directly transmitted via the BLUETOOTH advertisement. In this way, another device that receives the BLUETOOTH advertisement cannot learn specific information of the first electronic device. This improves security of the first electronic device. In addition, the public key is periodically updated, to avoid a problem that the public key information is tracked and cracked. This improves information transmission security, and protects user privacy of the lost device.

In some embodiments, a BLUETOOTH advertisement packet carries a lost identifier, for example, an identifier of a flag bit in the BLUETOOTH packet is "lost device". In this way, when receiving the BLUETOOTH advertisement, the receiving electronic device may trigger a subsequent step for further determining the status of the first electronic device by the server. In some embodiments, the BLUETOOTH advertisement packet carries event code. For example, event code 01 indicates that when the electronic device receives the BLUETOOTH advertisement, the subsequent step for further determining the status of the first electronic device by the server may be triggered. Event code 02 indicates that when the electronic device receives the BLUETOOTH advertisement, a subsequent step for reporting the location to the server may be triggered. After receiving the packet, the second electronic device may identify an event corresponding to the event code, and execute the corresponding event based on the event code.

S103: The second electronic device 200 receives, by using the BLUETOOTH module, the BLUETOOTH advertisement transmitted by the first electronic device, and the first electronic device 100 establishes a connection to the second electronic device 200 through BLUETOOTH.

Figure 6A:
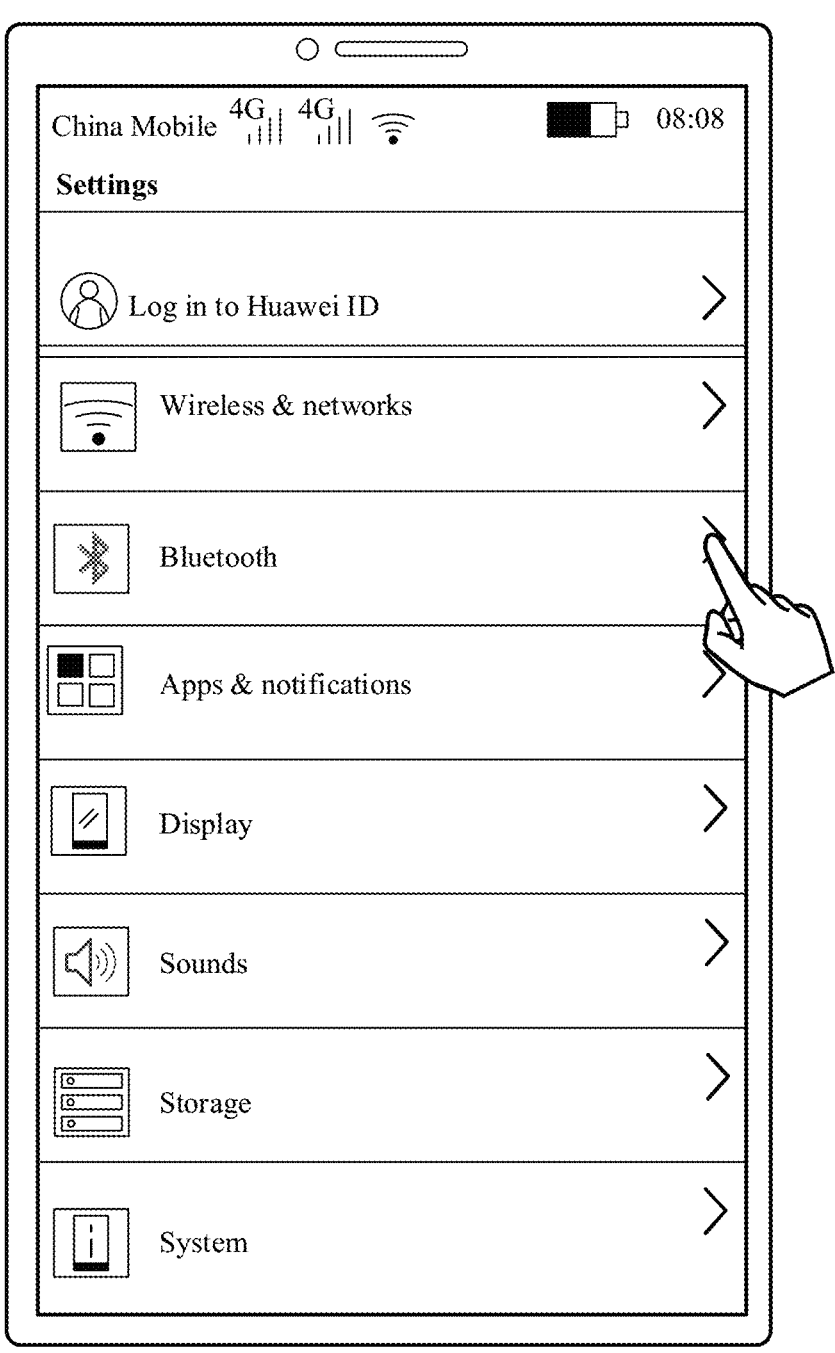
FIG. 6*a* and FIG. 6*b* are schematic diagrams of interfaces of a second electronic device according to an embodiment of this application.
Figure 6B:
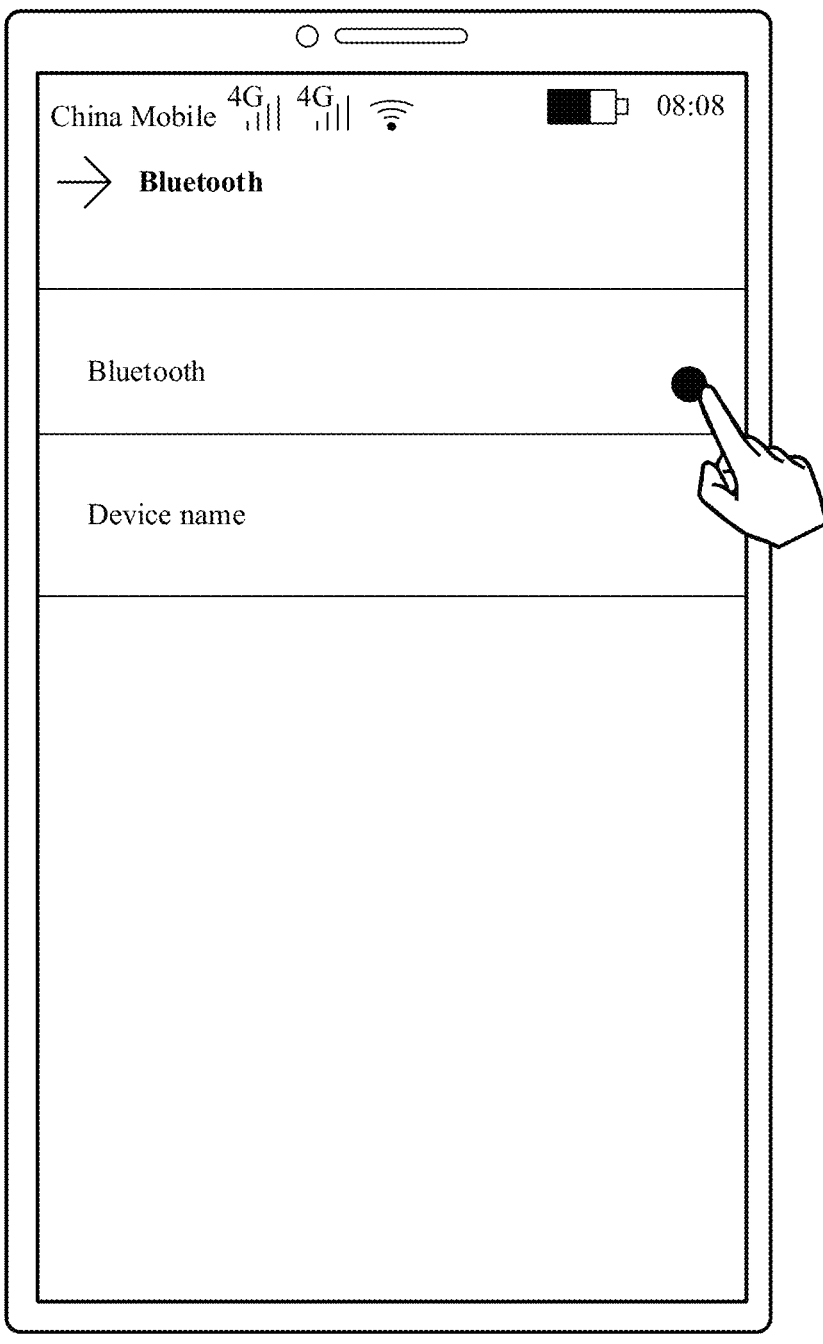

In some embodiments, the second electronic device may be any device around the lost device. The second electronic device may communicate with the first electronic device through BLUETOOTH. As shown in FIG. 6a and FIG. 6b, the BLUETOOTH function may be enabled on settings of the second electronic device. After the BLUETOOTH function is enabled, the second electronic device may listen to the advertisement transmitted by the first electronic device, and assist in locating of the first electronic device.

In some implementations, in step S102, the BLUETOOTH module of the first electronic device 100 performs BLUETOOTH advertising at preset transmitting frequency when transmitting the BLUETOOTH advertisement. For example, the BLUETOOTH advertisement is transmitted every interval of preset time T, and duration for the BLUETOOTH advertisement transmission is X seconds. Within the X seconds, BLUETOOTH advertisement information is continuously transmitted. In the procedure in which the first electronic device sends the BLUETOOTH signal, the power consumption of the first electronic device is equal to X (seconds)/half an hour.

Correspondingly, in some implementations, in step S103, when performing signal scanning, the BLUETOOTH module of the second electronic device 200 performs scanning at preset scanning frequency. At the preset scanning frequency, the second electronic device performs scanning one time every y seconds, and duration for each scanning operation is z seconds. The preset transmitting frequency and the preset scanning frequency meet a preset rule, and the preset rule meets X≥y. In the foregoing procedure, the preset rule ensures that once a sender initiates advertising, a receiver, when there is a receiver, may receive the advertisement. This saves a procedure of detecting whether the other party exists. As long as different devices receive and transmit the advertisement based on a unified specification, the sender and the receiver can complete handshaking communication.

In some embodiments, a transmitter transmits the BLUETOOTH advertisement within X seconds, a receiver continuously performs scanning for z seconds, and the scanning interval is delivered by the server to the first electronic device and the second electronic device. Specifically, when search modules are provided for the first electronic device and the second electronic device, the server may send specific duration information to the search modules of the first electronic device and the second electronic device, to ensure that the transmitting frequency of the first electronic device and the scanning frequency of the second electronic device meet the preset condition.

Figures 4A, 4B:
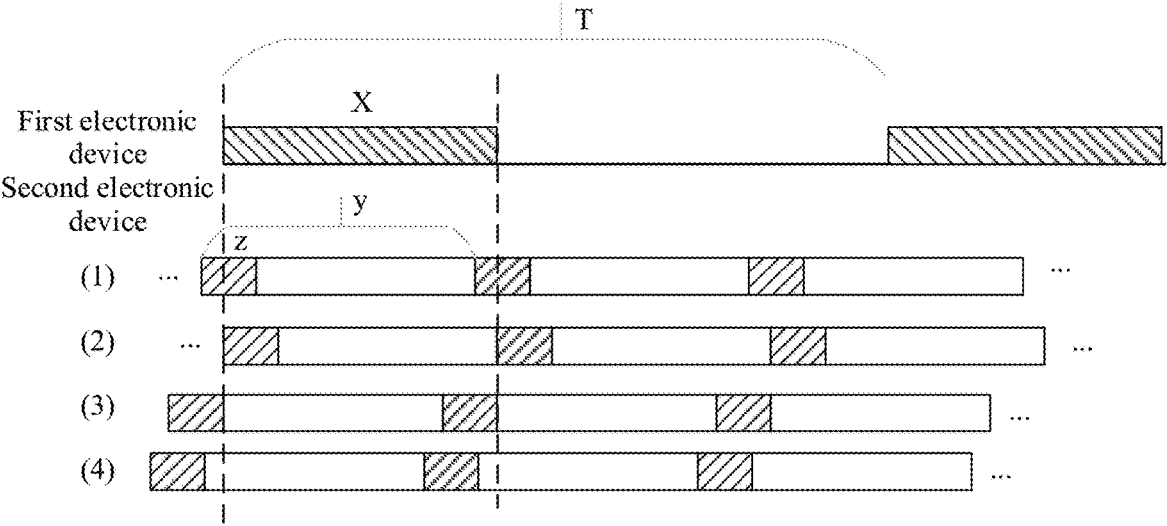
FIG. 4*a* and FIG. 4*b* are schematic diagrams of time sequences of BLUETOOTH signals according to an embodiment of this application.

Specifically, as shown in FIG. 4a, when X=y, the first electronic device transmits the BLUETOOTH advertisement one time every preset time T, and duration for each transmission operation is X seconds. The second electronic device performs scanning one time every y seconds, and duration for each scanning operation is z seconds. That the first electronic device transmits the BLUETOOTH advertisement and the second electronic device performs scanning for the BLUETOOTH advertisement includes: (1) The first electronic device starts to transmit the BLUETOOTH advertisement, and the second electronic device is performing scanning; (2) when the first electronic device starts advertising, the second electronic device simultaneously starts scanning; (3) when the first electronic device starts advertising, the second electronic device just finishes scanning; and (4) when the first electronic device starts advertising, the second electronic device does not perform scanning. It can be learned from the figure that, in the foregoing four cases, in a procedure in which the first electronic device transmits the BLUETOOTH advertisement (continuously for X seconds), the second electronic device may detect, through scanning in a period of time, the BLUETOOTH advertisement signal sent by the first electronic device. Therefore, when the first electronic device transmits the BLUETOOTH advertisement at the preset transmitting frequency, and the second electronic device performs scanning for the BLUETOOTH signals at preset receiving frequency, where the preset transmitting frequency and the preset receiving frequency meet X-y, the second electronic device may detect, through scanning, the BLUETOOTH advertisement transmitted by the first electronic device.

Specifically, as shown in FIG. 4b, when X>y, the first electronic device transmits the BLUETOOTH advertisement one time every preset time T, and duration for each transmission operation is X seconds. The second electronic device performs scanning one time every y seconds, and duration for each scanning operation is z seconds. That the first electronic device transmits the BLUETOOTH advertisement and the second electronic device performs scanning for the BLUETOOTH advertisement includes: (1) The first electronic device starts to transmit the BLUETOOTH advertisement, and the second electronic device is performing scanning; (2) when the first electronic device starts advertising, the second electronic device simultaneously starts scanning; (3) when the first electronic device starts advertising, the second electronic device just finishes scanning; and (4) when the first electronic device starts advertising, the second electronic device does not perform scanning. It can be learned from the figure that, in the foregoing four cases, in a procedure in which the first electronic device transmits the BLUETOOTH advertisement (continuously for X seconds), the second electronic device may detect, through scanning in a period of time, the BLUETOOTH advertisement signal sent by the first electronic device. Therefore, when the first electronic device transmits the BLUETOOTH advertisement at the preset transmitting frequency, and the second electronic device performs scanning for the BLUETOOTH signals at preset receiving frequency, where the preset transmitting frequency and the preset receiving frequency meet X>y, the second electronic device may detect, through scanning, the BLUETOOTH advertisement transmitted by the first electronic device.

The foregoing procedure is a BLUETOOTH-assisted locating phase. In the conventional technology, in the phase 1, the procedure for finding the lost device is continuously performed. In other words, when the functions of the BLUETOOTH modules on the electronic devices are enabled, a receiving device continuously performs scanning, and a transmitting device continuously sends BLUETOOTH signals. Therefore, in a procedure of determining a lost state, the BLUETOOTH matrix modules of the transmitting device and the receiving device consume a large amount of power. According to the foregoing solution, in a procedure of determining the lost state, steps for setting the frequency at which the transmitting device sends the signals and the frequency at which the receiving device receives the signals are performed, to ensure that the transmitting device and the receiving device may discover each other. In addition, this lowers power consumption of the transmitting device and the receiving device, and avoids a waste of the power consumption in the procedure of determining the lost state.

Specifically, it may be understood that, when the power consumption of the transmitter in this embodiment of this application is compared with the power consumption of the transmitter in the conventional technology, the power consumption in this application is X (time of continuous transmission operations)/T (the preset interval) of the power consumption in the conventional technology, and that when the power consumption of the receiver in this embodiment of this application is compared with the power consumption of the receiver in the conventional technology, the power consumption in this application is z (time of continuous scanning operations)/y (the preset interval) of the power consumption in the conventional technology. In some embodiments, to reduce the power consumption of the second electronic device, the time y for continuous scanning operations may be reduced based on a premise that the BLUETOOTH signal may be detected through scanning. The power consumption of the transmitting device and the power consumption of the receiving device may be controlled with any precision by controlling a ratio of the time of continuous transmission to the entire time of an enabled task and a ratio of the time of continuous scanning to the entire time of the enabled task.

S104: The BLUETOOTH module of the second electronic device sends a first instruction to the search module of the second electronic device. The first instruction is used to trigger the search module to send a query request to the server.

In some embodiments, after receiving the BLUETOOTH advertisement, the second electronic device parses out that the BLUETOOTH packet flag bit is "lost device". The second electronic device is triggered to invoke the search module to send the query request to the server.

In some embodiments, information carried in the first instruction includes device information of the first electronic device. Specifically, the device information includes the identifier of the first electronic device or the public key information of the first electronic device. The identifier of the first electronic device or the public key information of the first electronic device may be obtained from the BLUETOOTH advertisement of the first electronic device. In some embodiments, the information carried in the first instruction may further include a power level of the second electronic device 200, a function parameter (for example, a locating function), and the like.

S105: The second electronic device sends the query request to the server 100. The determining operation means checking status information of the first electronic device.

In some embodiments, information for determining includes the identifier of the first electronic device or the public key information of the first electronic device. The identifier of the first electronic device or the public key information of the first electronic device may be obtained from the BLUETOOTH advertisement of the first electronic device.

S106: The server checks a status of the first electronic device.

Specifically, the server checks the status of the first electronic device based on the identifier of the first electronic device or the public key information of the first electronic device. The status includes the lost state or a normal use state.

In some embodiments, the lost state of the first electronic device may be obtained through updating by using steps S200 and S201.

S107: The server sends the status of the first electronic device to the second electronic device.

S108: The second electronic device sends the status of the first electronic device to the first electronic device.

Specifically, the server sends the status of the first electronic device to the search module of the second electronic device. The search module of the second electronic device sends the status of the first electronic device to the search module of the first electronic device by using the BLUETOOTH module of the second electronic device and the BLUETOOTH module of the first electronic device.

S200: A third electronic device sends first report information to the server.

Specifically, the user logs in to an official website of the mobile phone manufacturer on the third electronic device, or reports the status information of the lost mobile phone by using the search module of the third electronic device. In some embodiments, the report information carries account information of the user.

Figure 7A:
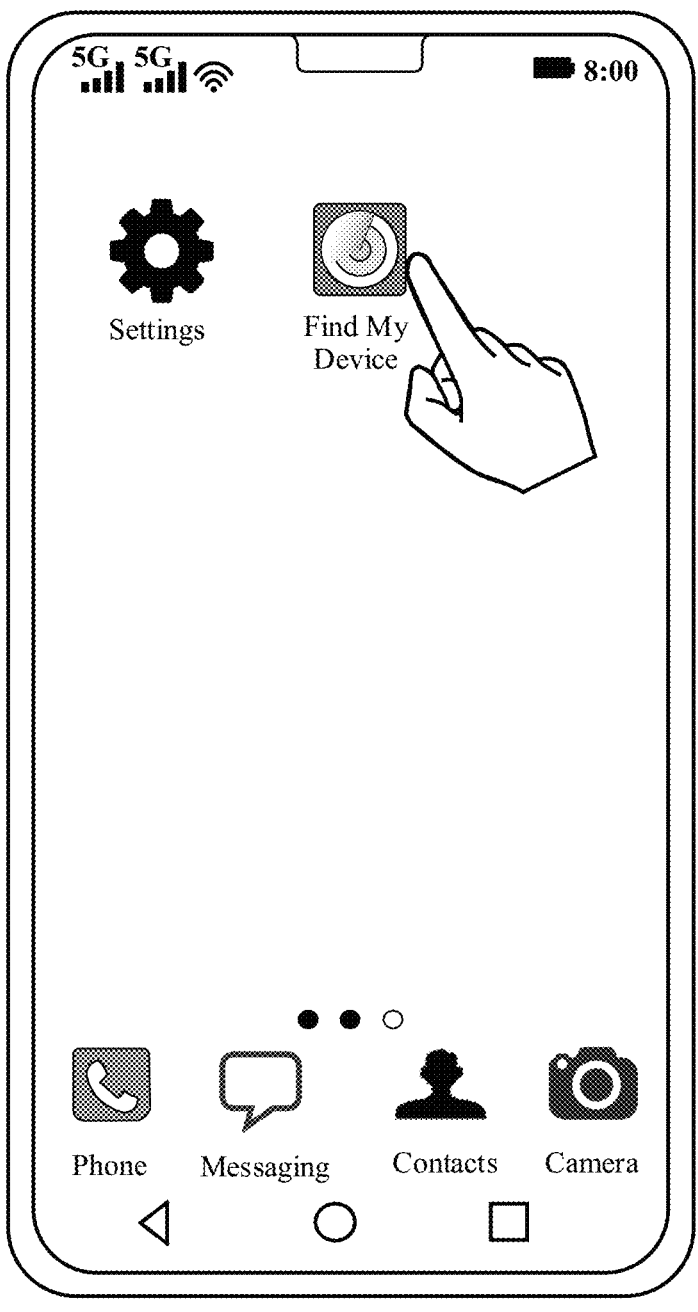
FIG. 7*a* to FIG. 7*c* are schematic diagrams of interfaces of a third electronic device according to an embodiment of this application.
Figure 7B:
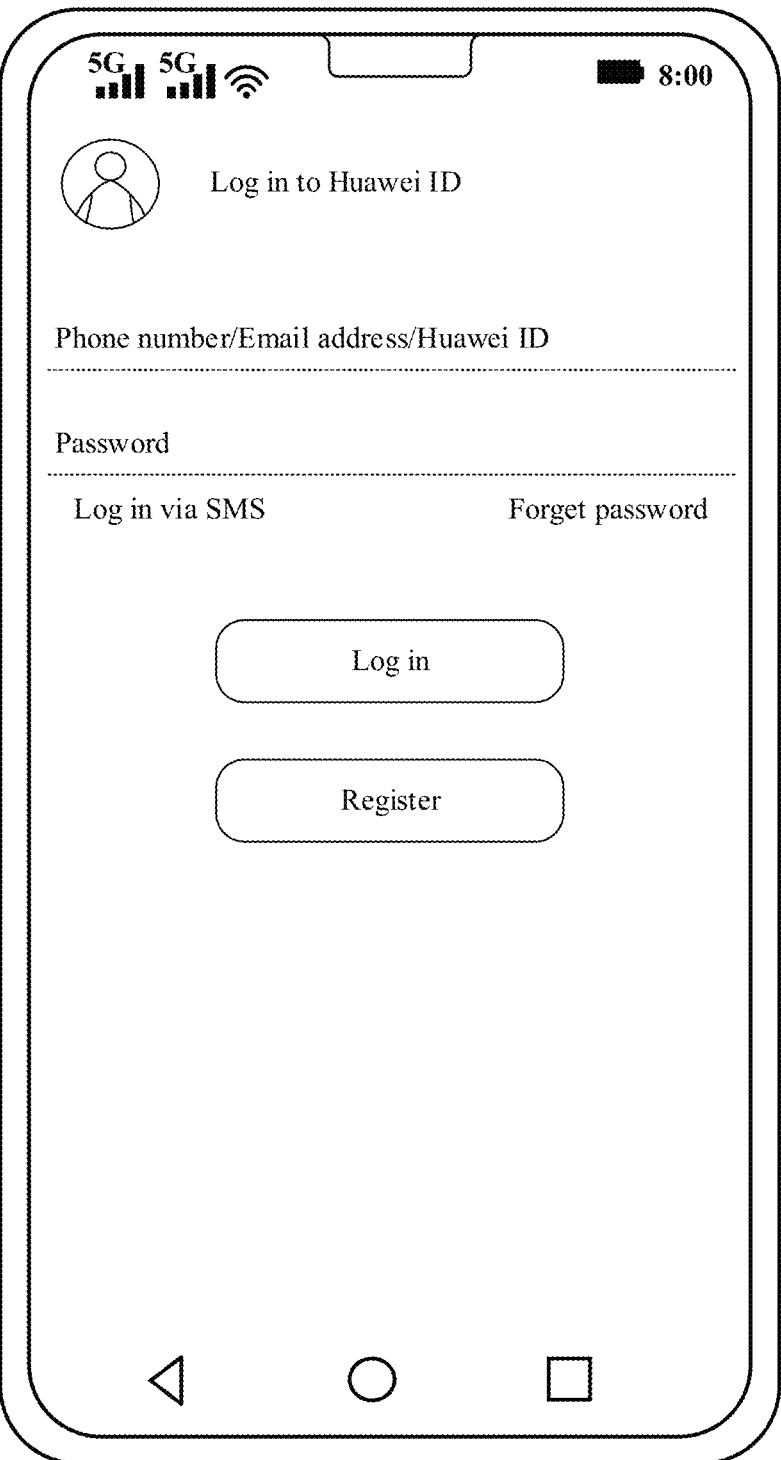

As shown in FIG. 7a, the user may tap a "Find My Device" icon on the third electronic device to access the search module. As shown in FIG. 7b, the user may log in with the account of the lost device. In an interface shown in FIG. 7c, the user may tap "Lost mode" to lock the lost device.

Figure 5D:
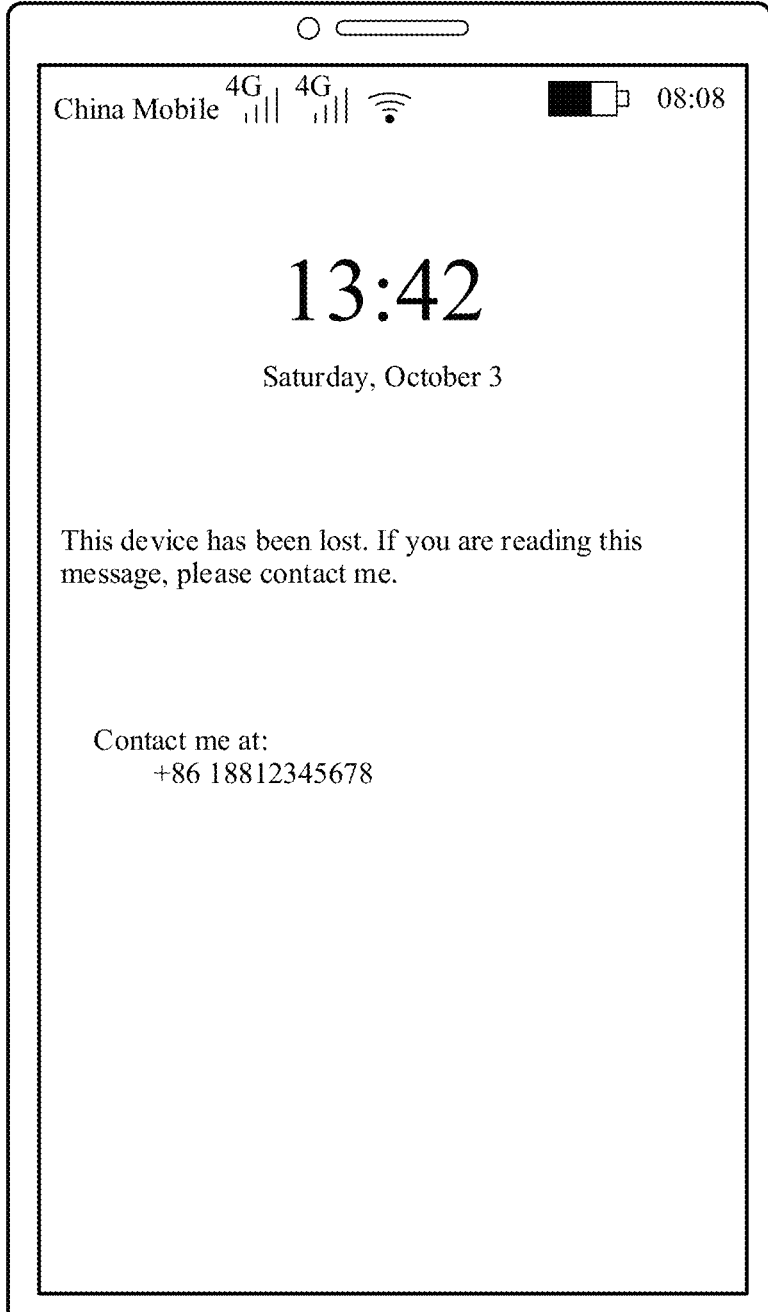

In some implementations, if the first electronic device is in the network-connected state, when the server receives information that indicates the lost state of the first electronic device and that is reported by the third electronic device, the server sends an instruction for locking the first electronic device. In this case, a lock interface of the first electronic device is shown in FIG. 5d, and information indicating that the device has been lost is displayed on the interface, which may be specifically "This device has been lost. If you are reading this message, please contact me". In addition, specific contact information may be displayed, for example, "Contact me at: +86 18812345678". In this way, a user who finds the lost mobile phone may contact the owner.

S201: The server records the lost state of the first electronic device.

In some embodiments, the server associates the account information of the user in the report information with the user equipment and the public key information of the user equipment based on the first report information, and updates the status of the first electronic device from the normal use state to the lost state.

Phase 2: The first electronic device obtains location information of a nearby device by using the second electronic device.

S301: The first electronic device initiates an offline locating request. The offline locating request indicates that the first electronic device to be paired with the second electronic device through BLUETOOTH, and indicates the second electronic device to initiate the offline finding function.

Specifically, after the first electronic device receives the status of the first electronic device sent by the second electronic device, if the status of the first electronic device is the lost state, the first electronic device initiates the offline locating request. The offline locating request indicates that the first electronic device to be paired with the second electronic device through BLUETOOTH.

S302: The second electronic device 200 receives, by using the BLUETOOTH module, the BLUETOOTH advertisement transmitted by the first electronic device, and the first electronic device 100 establishes a connection to the second electronic device 200 through BLUETOOTH in a second manner.

In some embodiments, to implement quick pairing between the first electronic device and the second electronic device, in the phase 2, a specific manner for pairing between the first electronic device and the second electronic device is different from the pairing manner in step S103 in the phase 1. In the phase 2, the lost state has been determined in the phase 1, and subsequent power consumption is worthwhile. Therefore, the pairing manner used in the phase 2 is to implement quick pairing between the second electronic device and the first electronic device.

In an implementation, that the first electronic device 100 establishes a connection to the second electronic device 200 through BLUETOOTH in a second manner includes: The first electronic device continuously transmits the BLUETOOTH advertisement in a second transmitting mode, and the second electronic device performs scanning in a second scanning mode.

The second transmitting mode is specifically as follows. The first electronic device continuously transmits the BLUETOOTH advertisement. This may include: The first electronic device continuously transmits the BLUETOOTH advertisement, or the first electronic device transmits the BLUETOOTH advertisement at second transmitting frequency. Compared with that at the preset transmitting frequency, it is found that at the second transmitting frequency, when pairing is performed in the second manner, the interval between two transmission operations of the first electronic device for the BLUETOOTH advertisement is shorter, and/or the duration for each transmission operation of the second electronic device for the BLUETOOTH advertisement is longer.

The second scanning mode is specifically as follows. The second electronic device continuously performs scanning for the BLUETOOTH advertisement. This may include: The second electronic device continuously performs scanning for the BLUETOOTH advertisement transmitted by the first electronic device, or the second electronic device scans, at second scanning frequency, the BLUETOOTH advertisement sent by the first electronic device. Compared with that at the foregoing preset scanning frequency, it is found that at the second scanning frequency, when pairing is performed in the second manner, an interval between two scanning operations of the second electronic device is shorter, and/or duration for each scanning operation of the second electronic device is longer.

In some embodiments, after step S107 is performed, the second electronic device 200 switches to the second scanning mode, that is, the mode of continuously performing scanning or performing scanning at the second frequency. Specifically, when the second electronic device receives information that is returned by the server and that indicates the lost state of the first electronic device, the second electronic device proceeds to the phase 2. The second electronic device controls the BLUETOOTH module to switch from the scanning mode for the lost state to the second scanning mode.

In some other embodiments, after step S302 is performed, the second electronic device 200 switches to the first scanning mode for the lost state. Specifically, after the second electronic device is successfully paired with the first electronic device, the second electronic device controls the BLUETOOTH module to switch from the second scanning mode to the scanning mode for the lost state, to reduce the power consumption of the second electronic device.

In addition, the location information of the second electronic device is reported to the server.

In some embodiments, after step S108 is performed, that is, after the first electronic device receives the information that is returned by the second electronic device and that indicates the lost state of the first electronic device, the first electronic device controls the BLUETOOTH module to switch from the transmitting mode for the lost state to the second transmitting mode. In some statuses, before being connected to the Internet again, the first electronic device keeps performing BLUETOOTH information advertising in the second transmitting mode and performing pairing. In this scenario, the lost state of the first electronic device has been determined. Therefore, the first electronic device keeps using the second transmitting mode, so that the first electronic device can be paired with the second electronic device more quickly. A probability of finding the lost device is improved, without increasing the power consumption of the BLUETOOTH module.

In some implementations, the BLUETOOTH module of the second electronic device for finding a lost device and a BLUETOOTH module of the second electronic device for executing a common BLUETOOTH function are different modules or different units. Specifically, the two modules may independently execute different tasks, for example, may perform scanning at different frequency, or may perform scanning at different channels. Alternatively, the two modules may be different hardware units that are in the BLUETOOTH device and that are configured to process different functions.

In some embodiments, the BLUETOOTH module of the first electronic device or the BLUETOOTH module of the second electronic device for finding a lost device may be enabled in a manner shown in FIG. 6a and FIG. 6b. The user enables the BLUETOOTH function in the device, or a system may directly control the BLUETOOTH module for finding the lost device to be enabled. For the first electronic device, when the first electronic device determines that the electronic device is in the offline state, the first electronic device may directly control the BLUETOOTH module for finding the lost device to be enabled. In other words, even if the user does not manually enable the BLUETOOTH module of the first electronic device, the first electronic device may also automatically enable the BLUETOOTH module for finding the lost device. For the second electronic device, in some embodiments, the second electronic device requires the user to control the BLUETOOTH module for finding the lost device to be enabled, so that the second electronic device performs a function for pairing with the lost device after the user consents to perform pairing.

Specifically, in the phase 1, it is not determined that the first electronic device is in the lost state. Therefore, if the first electronic device continuously transmits the BLUETOOTH advertisement after it is determined that the electronic device is in the offline state, power consumption is increased, and standby time of the lost device is shortened. This affects normal use of the device. According to this embodiment of this application, time for transmitting the BLUETOOTH advertisement per unit of time is shortened. Therefore, the standby time of the first electronic device is prolonged. In this way, when it cannot be determined whether the lost device is truly lost, the power consumption and a loss caused when the terminal is in the offline state instead of the lost state are reduced. In addition, within the longer standby time, there are more opportunities for the first electronic device to be paired with a nearby second electronic device. This improves a probability of finding the lost device when the device is lost.

S303: The BLUETOOTH module of the second electronic device sends a second instruction to the search module of the second electronic device. The second instruction is used to trigger the search module to send update information to the server.

In some embodiments, after receiving the offline locating request, the second electronic device parses the device information of the first electronic device in the BLUETOOTH packet. Specifically, the device information includes the identifier of the first electronic device or the public key information of the first electronic device.

S304: The second electronic device sends the update information to the server. The update information includes current location information of the second electronic device.

In some embodiments, the location information of the second electronic device may be, for example, longitude/latitude information. The locating procedure may be implemented by using a global positioning system (GPS). In addition, the update information includes the device information of the first electronic device. Specifically, the device information of the first electronic device includes the identifier of the first electronic device or the public key information of the first electronic device. The identifier of the first electronic device or the public key information of the first electronic device may be obtained from the offline locating request sent by the first electronic device. The device information of the first electronic device indicates the server to match the location information of the second electronic device to the account of the first electronic device based on the device information of the first electronic device.

In some embodiments, when the first electronic device may establish BLUETOOTH short-range communication with the second electronic device, a physical distance between the two devices is within a specific range, for example, a range of about 10 meters, and the location of the second electronic device is used as a location near the first electronic device and reported to the server for the user to check.

S305: The server updates the location information of the first electronic device based on the update information.

The server matches the location information of the second electronic device to the account of the first electronic device based on the device information of the first electronic device. Specifically, the server may determine the account of the first electronic device based on the identifier of the first electronic device or the public key information of the first electronic device included in the device information of the first electronic device. The updating the location information of the first electronic device includes: The location information of the second electronic device is recorded as information about a location near the first electronic device. In this way, an association relationship is established between the location of the second electronic device, the first electronic device, and the account of the first electronic device.

In some embodiments, there may be a plurality of second electronic devices near the first electronic device. In this case, the updating the location information of the first electronic device specifically includes: The server may match location information of the plurality of second electronic devices to the account of the first electronic device, and the location information of the plurality of second electronic devices is recorded as information about locations near the first electronic device.

In some embodiments, there may be a plurality of second electronic devices near the first electronic device. In this case, a second electronic device may be selected at a server side or a second electronic device side, so that the find phone function on the first electronic device is not performed by excessive electronic devices. This reduces overall power consumption waste.

Specifically, a service counting module is provided for the search module of the second electronic device, and a preset first threshold is set for the service counting module. In some embodiments, when the server sends information to the second electronic device, the service counting module of the second electronic device resets to zero and starts counting again. The information may be an instruction periodically sent by the server to the electronic device. The instruction indicates the service counting module of the second electronic device to reset. Alternatively, the information may be frequency update information periodically sent by the server to the electronic device. When the second electronic device receives the frequency update information, the service counting module also resets.

In some embodiments, when the second electronic device sends the update information to the server (for example, S306), the service counting module stores one service record. In some embodiments, when the second electronic device sends the update information to the server (for example, S306) or the second electronic device sends the query request to the server (for example, S105), the service counting module stores one service record.

In some embodiments, the second electronic device determines whether the current quantity of service times exceeds the preset first threshold. If the quantity of service times exceeds the preset threshold, the second electronic device no longer performs steps S103 to S106, or the second electronic device performs steps S302 to S304. In some embodiments, the second electronic device may disable the BLUETOOTH module, and no longer attempts to be paired with the first electronic device. In some other embodiments, after being paired with the first electronic device through BLUETOOTH, that is, after S103 and S302 are performed, the second electronic device determines whether the current quantity of service times exceeds the preset first threshold. If the quantity of service times exceeds the preset threshold, the second electronic device no longer sends the query request (S104 to S106) or the update information (S303 and S304) to the server. As shown in FIG. 8a, a second electronic device 201 determines that a current quantity of service times exceeds a preset first threshold. Thus, the second electronic device 201 does not send a query request or an offline locating request to the server. Second electronic devices 200 and 202 determine that the current quantity of service times does not exceed the preset first threshold. Thus, the second electronic devices 200 and 202 send query requests to the server and receive status information returned by the server, or send offline locating requests to the server. Therefore, the device 201 does not subsequently exchange information with the lost device.

According to the foregoing embodiment, the second electronic device provides limited services, provided that the second electronic device side limits the quantity of service times. A single device does not communicate with a plurality of lost devices, or the single device does not communicate with a device for a plurality of times. This avoiding excessively high power consumption.

Specifically, a module for counting second electronic devices is provided for the server, and a preset second threshold is set for the module for counting second electronic devices. When the plurality of second electronic devices send query requests to the server, the server side determines whether a quantity of second electronic devices exceeds the preset second threshold. If the quantity of second electronic devices exceeds the preset second threshold, the server selects, from the plurality of second electronic devices, second electronic devices to communicate with the first electronic device, where a quantity of selected second electronic devices is equal to the second threshold. A second electronic device that is not selected by the server does not need to be paired and collaborated with the lost device. Specifically, the device that is not selected by the server does not receive the status information of the first electronic device sent and returned by the server, and thus does not perform the subsequent step. According to the foregoing embodiment, an election center on a server side is used. The server side performs unified decision-making and quota management, so that services are not provided by an excessive quantity of second electronic devices for a same lost device. This simplifies message interworking between the plurality of devices, improves decision accuracy of the server, reduces a quantity of established and consumed links, and avoids unnecessary repeated power consumption.

As shown in FIG. 8b, after receiving the query requests from the second electronic devices, the server side determines that the quantity of second electronic devices exceeds the preset second threshold, and selects the devices 200 and 202 as devices that need to be paired and collaborated with the lost device. The device 201 is a device that does not need to be paired and collaborated with the lost device. In this case, the server returns the status information of the first electronic device to the devices 200 and 202, but does not return the status information of the first electronic device to the device 201. Therefore, the device 201 does not subsequently exchange information with the lost device.

S305: The server sends the location of the second electronic device to the third electronic device based on the information of the first electronic device. The user logs in with the account of the first electronic device on the third electronic device.

The server sends, based on the account of the first electronic device that matches to the location information of the second electronic device, the location information of the second electronic device to the device on which the user logs in with the account of the first electronic device.

S306: The third electronic device obtains the update information, and updates the location information of the first electronic device.

Figure 7C:
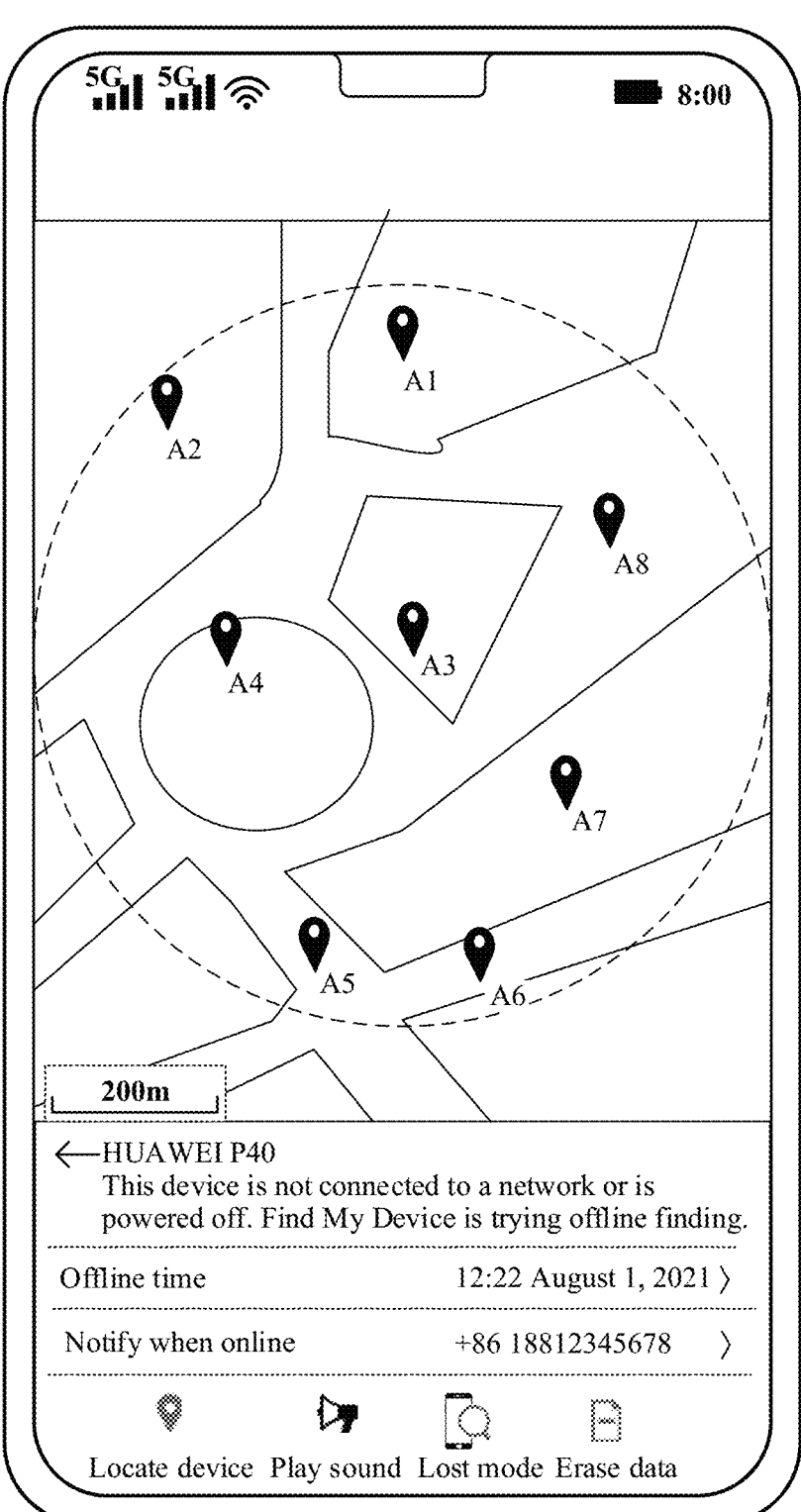

In some embodiments, the third electronic device displays a first interface of the search module on the third electronic device based on the obtained update information. The first interface may include at least one second electronic device. As shown in FIG. 7c, the second electronic device includes devices A1 to A8, and the first interface may further display a distance scale line. In this way, the user may intuitively see locations of the second electronic devices near the first electronic device by viewing the first interface, so that the user determines, based on the locations of the second electronic devices, an approximate area in which the first electronic device is located. In this way, the user may find the lost device more quickly and accurately, and a probability of finding the lost device is improved.

Figure 9A:
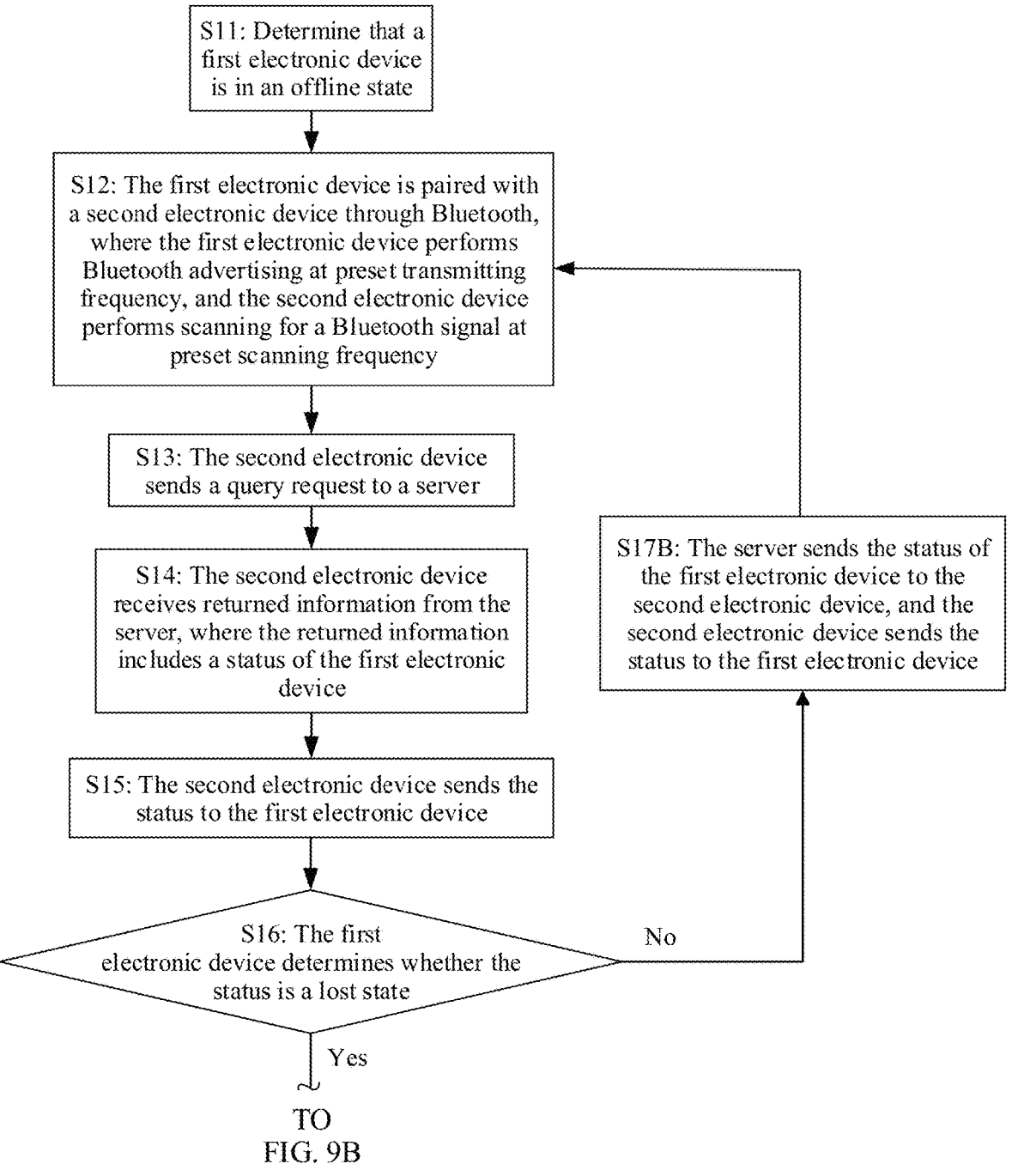
Figure 10A:
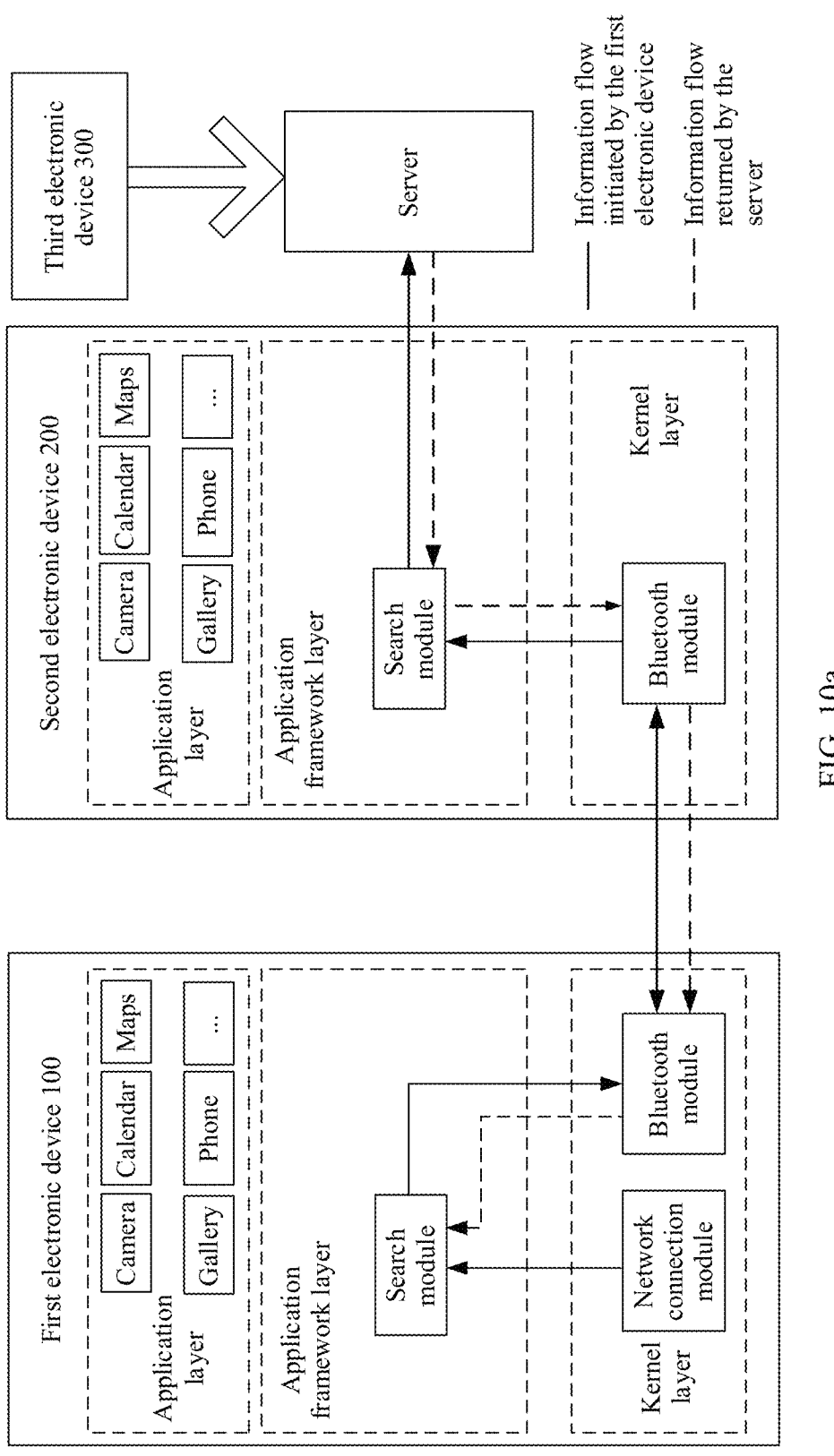
FIG. 10*a* is a schematic diagram of information flows in a software module of a first electronic device according to an embodiment of this application.
Figure 10B:
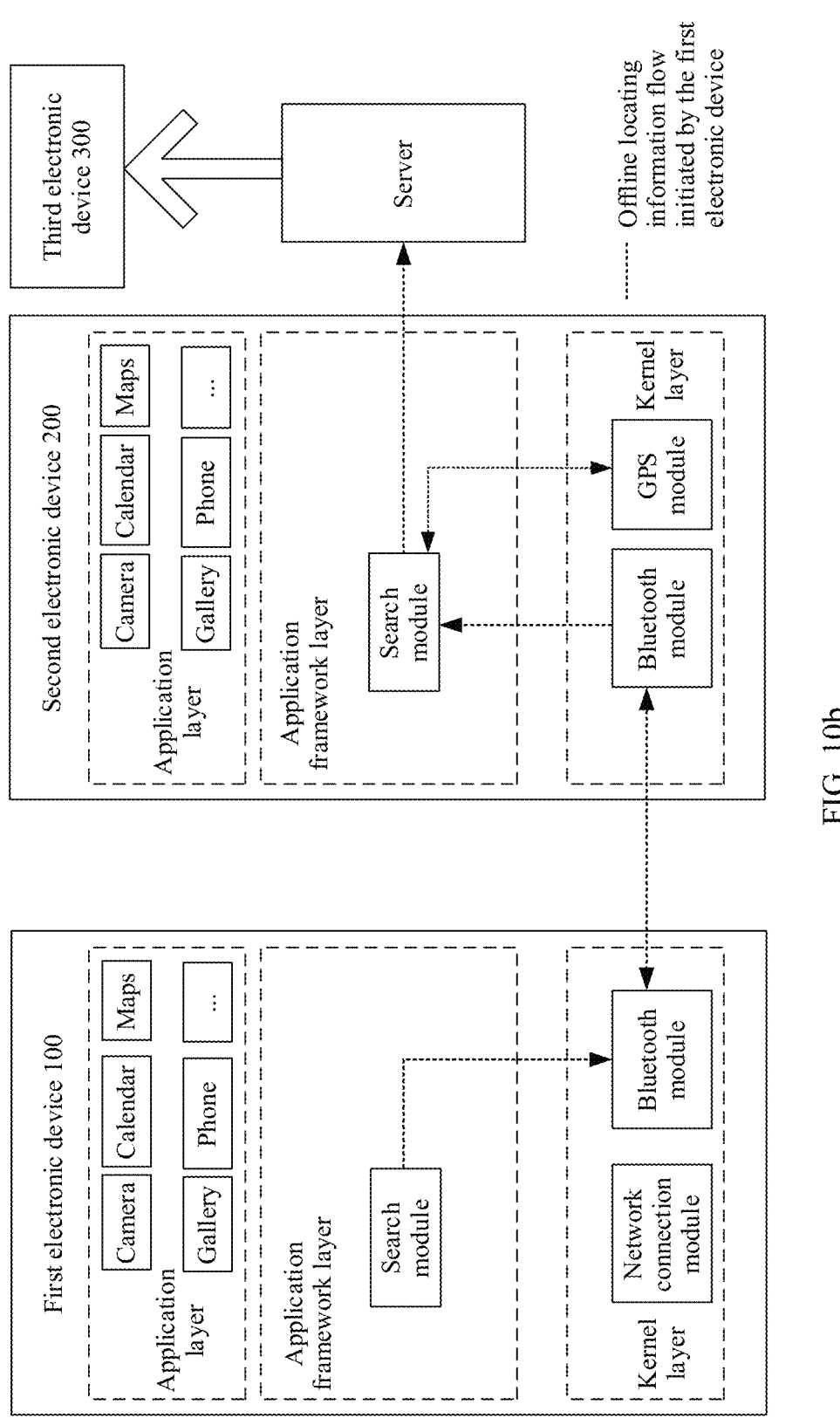
FIG. 10*b* is a schematic diagram of information flows in a software module of a first electronic device according to an embodiment of this application.

FIG. 9A and FIG. 9B are a schematic diagram of an electronic device interaction method according to an embodiment of this application. FIG. 10a and FIG. 10b are schematic diagrams showing information flows in an electronic device interaction method, and show electronic device interaction between the first electronic device 100 and the second electronic device 200, and an internal data processing procedure of the first electronic device 100.

S11: A first electronic device determines that the electronic device is in an offline state.

Specifically, in an embodiment, as shown in FIG. 10a, a search module of the first electronic device invokes a network connection module to report network status information to the search module, or when detecting that a connection status changes, the network connection module of the first electronic device reports the network status information to the search module. The search module of the first electronic device determines that the first electronic device is in a network-connected state or the offline state.

S12: The first electronic device is paired with a second electronic device through BLUETOOTH. The first electronic device performs BLUETOOTH advertising at preset transmitting frequency, and the second electronic device performs scanning for a BLUETOOTH signal at preset scanning frequency.

Specifically, the search module of the first electronic device invokes a BLUETOOTH module of the first electronic device, so that the BLUETOOTH module of the first electronic device transmits a BLUETOOTH advertisement. The BLUETOOTH module of the first electronic device 100 performs BLUETOOTH advertising at the preset transmitting frequency when transmitting the BLUETOOTH advertisement. For example, the BLUETOOTH advertisement is transmitted every interval of preset time T, and duration for the BLUETOOTH advertisement transmission is X seconds. When performing signal scanning, the BLUETOOTH module of the second electronic device 200 performs scanning at preset scanning frequency. At the preset scanning frequency, the second electronic device performs scanning one time every y seconds, and duration for each scanning operation is z seconds. The preset transmitting frequency and the preset scanning frequency meet a preset rule, and the preset rule meets $X \geq y$.

S13: The second electronic device sends a query request to a server.

After analyzing a BLUETOOTH packet, the BLUETOOTH module of the second electronic device invokes a search module to send the query request to the server. The server checks a status of the first electronic device based on information reported by a third electronic device, and returns the status to the search module of the second electronic device.

S14: The second electronic device receives returned information sent by the server. The returned information includes a status of the first electronic device.

S15: The second electronic device sends the status of the first electronic device to the first electronic device.

The search module of the second electronic device obtains the returned information sent by the server, and sends the returned information to the BLUETOOTH module by using the BLUETOOTH module of the second electronic device.

S16: The first electronic device determines whether the status is a lost state.

The BLUETOOTH module of the first electronic device sends the returned information to the search module. The BLUETOOTH module or the search module of the first electronic device analyzes the returned information, to determine whether the status is the lost state.

S17A: If the first electronic device is in the lost state, the first electronic device sends an offline locating request. The offline locating request indicates the second electronic device to send location information of the second electronic device to the server.

As shown in FIG. 10*b*, the search module of the first electronic device sends the offline locating request by using the BLUETOOTH module. The offline locating request indicates the second electronic device to send the location information of the second electronic device to the server. In some embodiments, the offline locating request indicates the first electronic device to be paired with the second electronic device through BLUETOOTH in a second manner. The specific pairing manner is similar to that described in the foregoing embodiment. Details are not described herein again.

S17B: If the first electronic device is not in the lost state, that is, if the first electronic device is in a normal state, the server sends the status of the first electronic device to the second electronic device. The second electronic device sends the status to the first electronic device. After receiving the status, the first electronic device determines that the first electronic device is in a normal state, and the foregoing procedure of S12 to S16 is repeated.

S18: The second electronic device obtains the offline locating request. The second electronic device obtains the location information of the second electronic device based on the offline locating request, and sends the location information of the second electronic device to the server.

The search module of the second electronic device obtains the offline locating request by using the BLUETOOTH module. The search module invokes a GPS module to obtain the location information of the second electronic device, and sends the location information of the second electronic device to the server.

S19: The server sends the location information of the second electronic device to the third electronic device. The third electronic device displays a first interface, and the first interface includes the location information of the second device.

The implementations of this application may be randomly combined, to achieve different technical effect.

Related parts of the method embodiments in this application may be mutually referenced. The apparatuses provided in the apparatus embodiments are configured to perform the methods provided in the corresponding method embodiments. Therefore, for the apparatus embodiments, refer to related parts in the related method embodiments for understanding.

In this application, "and/or" describes an association relationship between associated objects, and indicates that three relationships may exist. For example, A and/or B may indicate the following three cases: A exists alone, both A and B exist, and B exists alone, where A and B may be singular or plural. The character "/" generally indicates an "or" relationship between the associated objects.

In this application, "at least one" means one or more, and "a plurality of" means two or more. "At least one of the following items (pieces)" or a similar expression thereof refers to any combination of these items, including any combination of singular items (pieces) or plural items (pieces). For example, "at least one (piece) of a, b, or c" or "at least one (piece) of a, b, and c" may all represent the following: a, b, c, a-b (in other words, a and b), a-c, b-c, or a-b-c, where a, b, and c may be singular or plural.

It should be understood that sequence numbers of the foregoing processes do not mean execution sequences in various embodiments of this application. Some or all of the steps may be performed in parallel or in sequence. The execution sequences of the processes should be determined based on functions and internal logic of the processes, and should not be construed as any limitation on the implementation processes of embodiments of this application.

It should be understood that although terms "first", "second", "third", and the like may be used in embodiments of the present invention to describe various messages, requests, and terminals, the messages, the requests, and the terminals are not limited by the terms. These terms are merely used to distinguish the messages, requests, and terminals. For example, without departing from the scope of embodiments of the present invention, a first terminal may also be referred to as a second terminal, and similarly, a second terminal may also be referred to as a first terminal.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In some embodiments of this application, the electronic device may be divided into function modules based on the foregoing method examples. For example, each function module corresponding to each function may be obtained through division, or two or more functions may be integrated into one processing module. The integrated module may be implemented in a form of hardware. It should be noted that, in some embodiments of this application, module division is an example, and is merely a logical function division. In actual implementation, another division manner may be used.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive), or the like.

A person of ordinary skill in the art may understand that all or some of the processes of the methods in embodiments may be implemented by a computer program instructing related hardware. The program may be stored in a computer-readable storage medium. When the program runs, the processes of the methods in embodiments are performed. The foregoing storage medium includes any medium that can store program code, like a ROM, a random access memory RAM, a magnetic disk, or an optical disc.

In summary, what is described above is merely embodiments of the technical solutions of this application, but is not intended to limit the protection scope of this application. Any modification, equivalent replacement, and improvement made in accordance with the disclosure of this application shall be included in the protection scope of this application.

What is claimed is:

1. An electronic device interaction method, comprising:
sending, by a first electronic device, a BLUETOOTH signal to a second electronic device, wherein the first electronic device is in a network-disconnected state;
scanning, by the second electronic device, the BLUETOOTH signal sent by the first electronic device;
pairing the first electronic device with the second electronic device through BLUETOOTH;
sending, by the second electronic device, a query request to a server;
receiving, by the second electronic device, returned information sent by the server, wherein the returned information comprises a status of the first electronic device;
sending, by the second electronic device, the status of the first electronic device to the first electronic device;
determining, by the first electronic device, whether the status is a lost state;
in response to the first electronic device being in the lost state, sending, by the first electronic device, an offline locating request, wherein the offline locating request indicates to the second electronic device to send location information of the second electronic device to the server;
obtaining, by the second electronic device, the offline locating request;
obtaining, by the second electronic device, the location information of the second electronic device based on the offline locating request; and
sending the location information of the second electronic device to the server.

2. The electronic device interaction method according to claim 1, wherein the sending, by a first electronic device, a BLUETOOTH signal to a second electronic device comprises:
performing, by the first electronic device, BLUETOOTH advertising at a preset transmitting frequency, wherein a BLUETOOTH advertisement is transmitted at the preset transmission frequency one time at an interval of a first interval, and duration for transmitting the BLUETOOTH advertisement is first duration.

3. The electronic device interaction method according to claim 2, wherein the scanning, by the second electronic device, the BLUETOOTH signal sent by the first electronic device comprises:
performing scanning, by the second electronic device at a preset scanning frequency, wherein BLUETOOTH signal scanning is performed at the preset scanning frequency at an interval of a second interval, and duration for the BLUETOOTH signal scanning is second duration.

4. The electronic device interaction method according to claim 3, wherein a value of the second interval is not greater than a value of the first duration.

5. The electronic device interaction method according to claim 4, wherein before the sending, by a first electronic device, a BLUETOOTH signal to a second electronic device, the electronic device interaction method further comprises:
obtaining, by the first electronic device, the first interval and the first duration from the server; and
obtaining, by the second electronic device, the second interval and the second duration from the server.

6. The electronic device interaction method according to claim 1, wherein the offline locating request further indicates to the first electronic device to be paired with the second electronic device through BLUETOOTH for a second time.

7. The electronic device interaction method according to claim 1, wherein that the offline locating request further indicates to the first electronic device to be paired with the second electronic device through BLUETOOTH for a second time comprises:
pairing the first electronic device with the second electronic device through BLUETOOTH in a second manner, wherein the performing pairing through BLUETOOTH in a second manner comprises at least one of the following:
continuously transmitting, by the first electronic device, a BLUETOOTH advertisement; or
continuously scanning, by the second electronic device, the BLUETOOTH advertisement.

8. The electronic device interaction method according to claim 1, wherein before the sending, by a first electronic device, a BLUETOOTH signal to a second electronic device, the electronic device interaction method further comprises:
enabling a find phone function on the first electronic device.

9. The electronic device interaction method according to claim 1, wherein the electronic device interaction method further comprises:
logging in, by a user, with an account of the first electronic device on a third electronic device;
sending, by the server, update information to the third electronic device, wherein the update information comprises the location information of the second electronic device; and
displaying, by the third electronic device, a first interface, wherein the first interface comprises a location of the second electronic device.

10. The electronic device interaction method according to claim 1, wherein in response to the first electronic device being not in the lost state, the electronic device interaction method further comprises:

sending, by the first electronic device, BLUETOOTH signals to the second electronic device at a preset transmitting frequency; and scanning, by the second electronic device at a preset scanning frequency, the BLUETOOTH signals sent by the first electronic device.

11. The electronic device interaction method according to claim 1, wherein there are at least two second electronic devices, and before the receiving, by the second electronic device, returned information sent by the server, the electronic device interaction method further comprises:

determining, by the server, whether a quantity of the at least two second electronic devices exceeds a first threshold;

in response to determining that the quantity of the at least two second electronic devices does not exceed the first threshold, sending, by the server, the returned information to the at least two second electronic devices; and in response to determining that the quantity of the at least two second electronic devices exceeds the first threshold, selecting, by the server, a part of the quantity of the at least two second electronic devices from the at least two second electronic devices, and sending the returned information to the part of the quantity of the at least two second electronic devices.

12. The electronic device interaction method according to claim 1, wherein before the sending, by the second electronic device, a query request to a server, the electronic device interaction method further comprises:

determining, by the second electronic device, whether a quantity of service times exceeds a preset first threshold;

in response to determining that the quantity of service times does not exceed the preset first threshold, sending, by the second electronic device, the query request to the server; and in response to determining that the quantity of service times exceeds the preset first threshold, skipping sending, by the second electronic device, the query request to the server.

13. The electronic device interaction method according to claim 1, wherein before the obtaining, by the second electronic device, the location information of the second electronic device based on the offline locating request, and sending the location information of the second electronic device to the server, the electronic device interaction method further comprises:

determining, by the second electronic device, whether a quantity of service times exceeds a preset first threshold;

in response to determining that the quantity of service times does not exceed the preset first threshold, obtaining, by the second electronic device, the location information of the second electronic device, and sending the location information of the second electronic device to the server; and in response to determining that the quantity of service times exceeds the preset first threshold, skipping obtaining, by the second electronic device, the location information of the second electronic device.

14. An electronic device interaction method, comprising:

sending, by a first electronic device, a BLUETOOTH signal to a second electronic device, wherein the first electronic device is in a network-disconnected state;

pairing the first electronic device with the second electronic device through BLUETOOTH;

obtaining, by the first electronic device, a status that is of the first electronic device and that is sent by the second electronic device, wherein the status of the first electronic device is obtained by the second electronic device from a server;

determining, by the first electronic device, whether the status is a lost state; and in response to determining that the first electronic device is in the lost state, sending, by the first electronic device, an offline locating request, wherein the offline locating request indicates to the second electronic device to send location information of the second electronic device to the server.

15. The electronic device interaction method according to claim 14, wherein the sending, by a first electronic device, a BLUETOOTH signal to a second electronic device comprises:

performing, by the first electronic device, BLUETOOTH advertising at a preset transmitting frequency, wherein a BLUETOOTH advertisement is transmitted at the preset transmitting frequency one time at an interval of a first interval, and duration for transmitting the BLUETOOTH advertisement is first duration.

16. The electronic device interaction method according to claim 15, wherein the pairing the first electronic device with the second electronic device through BLUETOOTH comprises:

performing scanning, by the second electronic device at a preset scanning frequency, wherein BLUETOOTH signal scanning is performed at the preset scanning frequency at an interval of a second interval, and duration for the BLUETOOTH signal scanning is second duration.

17. The electronic device interaction method according to claim 16, wherein a value of the second interval is not greater than a value of the first duration.

18. The electronic device interaction method according to claim 17, wherein before the sending, by a first electronic device, a BLUETOOTH signal to a second electronic device, the electronic device interaction method further comprises:

obtaining, by the first electronic device, the first interval and the first duration from the server.

19. The electronic device interaction method according to claim 14, wherein the offline locating request further indicates to the first electronic device to be paired with the second electronic device through BLUETOOTH for a second time.

20. The electronic device interaction method according to claim 14, wherein that the offline locating request further indicates to the first electronic device to be paired with the second electronic device through BLUETOOTH for a second time comprises:

continuously transmitting, by the first electronic device, a BLUETOOTH advertisement; and pairing the first electronic device with the second electronic device through BLUETOOTH.

* * * * *